(12) United States Patent
Kanda

(10) Patent No.: US 12,468,587 B2
(45) Date of Patent: Nov. 11, 2025

(54) FAULT OPERATION CONTROL SYSTEM, FAULT OPERATION CONTROL METHOD, NON-TRANSITORY COMPUTER READABLE MEDIUM

(71) Applicant: RENESAS ELECTRONICS CORPORATION, Tokyo (JP)

(72) Inventor: Kenta Kanda, Tokyo (JP)

(73) Assignee: RENESAS ELECTRONICS CORPORATION, Tokyo (JP)

(*) Notice: Subject to any disclaimer, the term of this patent is extended or adjusted under 35 U.S.C. 154(b) by 69 days.

(21) Appl. No.: 18/482,580

(22) Filed: Oct. 6, 2023

(65) Prior Publication Data

US 2024/0168836 A1   May 23, 2024

(30) Foreign Application Priority Data

Nov. 21, 2022   (JP) .................................. 2022-185885

(51) Int. Cl.
*G06F 11/07* (2006.01)

(52) U.S. Cl.
CPC ...... *G06F 11/0709* (2013.01); *G06F 11/0766* (2013.01); *G06F 11/0793* (2013.01)

(58) Field of Classification Search
CPC ............. G06F 11/0709; G06F 11/0766; G06F 11/0793
See application file for complete search history.

(56) References Cited

U.S. PATENT DOCUMENTS

| 8,135,981 B1* | 3/2012 | Gawali | G06F 11/0727 714/42 |
| 8,296,602 B2 | 10/2012 | Fukuda | |
| 2002/0120884 A1* | 8/2002 | Nakamikawa | G06F 11/1482 714/31 |
| 2011/0004791 A1* | 1/2011 | Kokubu | G06F 11/0751 714/57 |
| 2020/0409784 A1* | 12/2020 | Ould-Ahmed-Vall | G06F 9/30076 |

FOREIGN PATENT DOCUMENTS

JP       2007-11426 A       1/2007

* cited by examiner

*Primary Examiner* — Bryce P Bonzo
*Assistant Examiner* — Audrey Emma Whitesell
(74) *Attorney, Agent, or Firm* — Rimon P.C.

(57) ABSTRACT

A device state monitoring unit monitors a state related to use of a resource of a first device and stores monitoring information during a normal operation. A device state monitoring unit monitors a state of a second device and stores monitoring information. A comparison unit calculates difference information by comparing hardware resource information of the second device used by a task that is executed by the second device before occurrence of a fault with resource information of the first device based on the stored monitoring information, when it is detected that the fault occurs in the second device. A processing determination unit determines and executes a countermeasure method for a fault operation according to the calculated difference information.

16 Claims, 17 Drawing Sheets

FAULT OPERATION CONTROL SYSTEM, FAULT OPERATION CONTROL METHOD, NON-TRANSITORY COMPUTER READABLE MEDIUM

CROSS-REFERENCE TO RELATED APPLICATIONS

The disclosure of Japanese Patent Application No. 2022-185885 filed on Nov. 21, 2022 including the specification, drawings and abstract is incorporated herein by reference in its entirety.

BACKGROUND

The present disclosure relates to a fault operation control system, a fault operation control method, and a non-transitory computer readable medium.

In the in-vehicle system, in order to deal with automatic driving Lv2 to Lv4, flexible expandability of the in-vehicle system and high-speed processing performance up to 700 TOPS are required. In order to meet these requirements, only performance improvement of a single device is insufficient. It is necessary to extend dynamic performance optimization of software (SW), which is conventionally closed in a single device configuration, to a multi-device configuration.

There is a disclosed technique listed below.
[Patent Document 1] Japanese Unexamined Patent Application Publication No. 2007-011426

Patent Document 1 discloses a plurality of abnormality detection circuits that detect abnormality of a plurality of processing units and generate an abnormality detection signal, and an abnormality monitoring control unit that controls at least one normal processing unit other than an abnormality processing unit in an abnormal state among the plurality of processing units to execute an abnormality relief process in response to the abnormality detection signal from any of the plurality of abnormality detection circuits. As a result, even if one of the plurality of processing units becomes inoperable, processing to be performed by the processing unit can be executed by another processing unit.

SUMMARY

As a framework for performing dynamic software SW performance optimization of a multi-device configuration, a multi-device framework has been proposed. The multi-device framework is a framework of SW intended to perform optimization for maximizing performance of an in-vehicle system by performing dynamic load distribution among heterogeneous multi-devices mounted in the in-vehicle system.

Meanwhile, a mechanism for securing the safety of the in-vehicle system in the related art also needs to be secured in an in-vehicle system equipped with a multi-device framework in the same manner. As a mechanism therefor, when a certain device commits a fault, it is necessary to realize, in a multi-device framework, a fail operation mechanism that conceals the fault by allocating a task processed at the fault destination to another device (fail soft) or safely stops the operation (fail safe).

The fail operation mechanism in a general load distribution system in the related art has a homogeneous multi-device configuration and is a fail software on the assumption that a backup device exists.

Therefore, when a fault occurs in an in-vehicle system having a heterogeneous configuration, there is a problem that the sustainability of the in-vehicle system cannot be enhanced.

The present disclosure has been made to solve such a problem, and an object thereof is to provide a fault operation control system, a fault operation control method, and the like suitable for a multi-device.

Other problems and novel features are apparent from the description of the present specification and the accompanying drawings.

A fault operation control system according to an embodiment is a system including multi-devices. Specifically, the fault operation control system includes a first device including a first processor and a first memory that stores an instruction configured to be executed by the first processor, and a second device including a second processor that is different from the first processor and a second memory that stores an instruction configured to be executed by the second processor. During the normal operation, the first processor monitors a state related to the use of a resource of the first device and stores monitoring information in a storage area, and the second processor monitors a state of the second device and stores monitoring information in a storage area. When it is detected that a fault occurs in the second device, the first processor calculates difference information by comparing hardware resource information of the second device used by a task that is executed by the second device before the occurrence of the fault with resource information of the first device based on the stored monitoring information, and determines and executes a countermeasure method for a fault operation according to the calculated difference information.

A fault operation control method according to an embodiment is a fault operation control method in a multi-device including a first device including a first processor and a first memory and a second device including a second processor that is different from the first processor and a second memory. During the normal operation, the first processor monitors a state related to the use of a resource of the first device and stores monitoring information in a storage area, and the second processor monitors a state of the second device and stores monitoring information in a storage area. When it is detected that the fault occurs in the second device, the first processor calculates difference information by comparing hardware resource information of the second device used by a task that is executed by the second device before the occurrence of the fault with resource information of the first device based on the stored monitoring information, and determines and executes a countermeasure method for a fault operation according to the calculated difference information.

A non-transitory computer readable medium according to an embodiment is a non-transitory computer readable medium that stores a program causing a computer to execute a fault operation control method in a multi-device including a first device including a first processor and a first memory and a second device including a second processor that is different from the first processor and a second memory.

According to an embodiment, a fault operation control system, a fault operation control method, and the like suitable for a multi-device can be provided.

DETAILED DESCRIPTION

Figure 1:
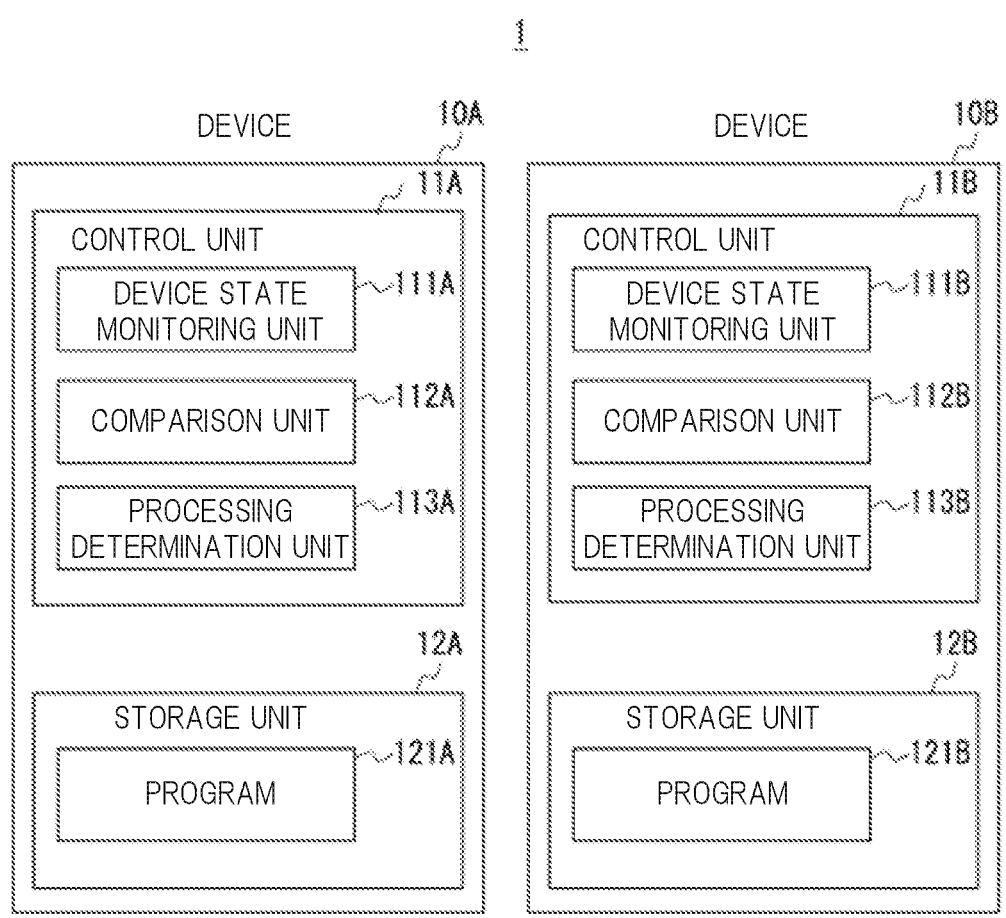
FIG. 1 is a block diagram of a fault operation control system according to a first embodiment.

For clarity of description, the following description and drawings are omitted and simplified as appropriate. In each drawing, the same elements are denoted by the same reference numerals, and redundant description is omitted as necessary.

First Embodiment

FIG. 1 is a block diagram of a fault operation control system according to a first embodiment.

The fault operation control system includes a fail operation mechanism suitable for a multi-device including two or more devices.

The fault operation control system includes a first device 10A including a first processor (control unit 11A in FIG. 1) and a first memory (storage unit 12A in FIG. 1) that stores an instruction configured to be executed by the first processor, and a second device 10B including a second processor (control unit 11B in FIG. 1) that is different from the first processor and a second memory (storage unit 12B in FIG. 1) that stores an instruction configured to be executed by the second processor.

When the processor executes a program, the control unit 11A of the device 10A functions as a device state monitoring unit 111A, a comparison unit 112A, and a processing determination unit 113A. Similarly, when the processor executes the program, the control unit 11B of the device 10B functions as a device state monitoring unit 111B, a comparison unit 112B, and a processing determination unit 113B.

During a normal operation, the device state monitoring unit 111A monitors a state related to the use of the resource of the first device and stores monitoring information (for example, in the storage units 12A and 12B or other storage units accessible by the first processor and the second processor).

The device state monitoring unit 111B monitors a state of the second device 10B and stores the monitoring information (for example, in the storage units 12A and 12B or other storage units accessible by the first processor and the second processor).

The comparison unit 112A calculates difference information by comparing hardware resource information of the second device used by a task that is executed by the second device before occurrence of a fault with resource information of the first device based on the stored monitoring information, when it is detected that the fault occurs in the second device 10B. The processing determination unit 113A determines and executes a countermeasure method for a fault operation according to the calculated difference information.

In some embodiments, countermeasure methods for fault operations are provided correspondingly for each specification difference between the devices so that detailed specification differences between the devices can be closely coped with. In addition, in another embodiment, a countermeasure method for a fault operation is provided for each task that has been executed by the device so that processing contents of the task that is being executed or is scheduled to be executed can be optimally coped with in terms of performance.

In addition, one embodiment can be a fault operation control method using the above-described fault operation control system or a program for causing a computer to execute the fault operation control method.

In the above-described example, the program includes a group of instructions (or software codes) for causing the computer to perform one or more functions described in the embodiments when being read by the computer. The program may be stored in a non-transitory computer readable medium or a tangible storage medium. By way of example but not limitation, a computer-readable medium or a tangible storage medium includes a random-access memory (RAM), a read-only memory (ROM), a flash memory, a solid-state drive (SSD), or other memory technology, a CD-ROM, a digital versatile disc (DVD), a Blu-ray (registered trademark) disk, or other optical disk storage, a magnetic cassette, a magnetic tape, a magnetic disk storage, or other magnetic storage device. The program may be transmitted onto a transitory computer readable medium or a communication medium. By way of example but not limitation, the transitory computer-readable media or communication media include electrical, optical, acoustic, or other forms of propagated signals.

According to the configuration according to the first embodiment described above, an optimal fail mechanism can be provided even in a system in which a multi-device framework is mounted (in particular, a heterogeneous configuration).

Second Embodiment

Figure 2:
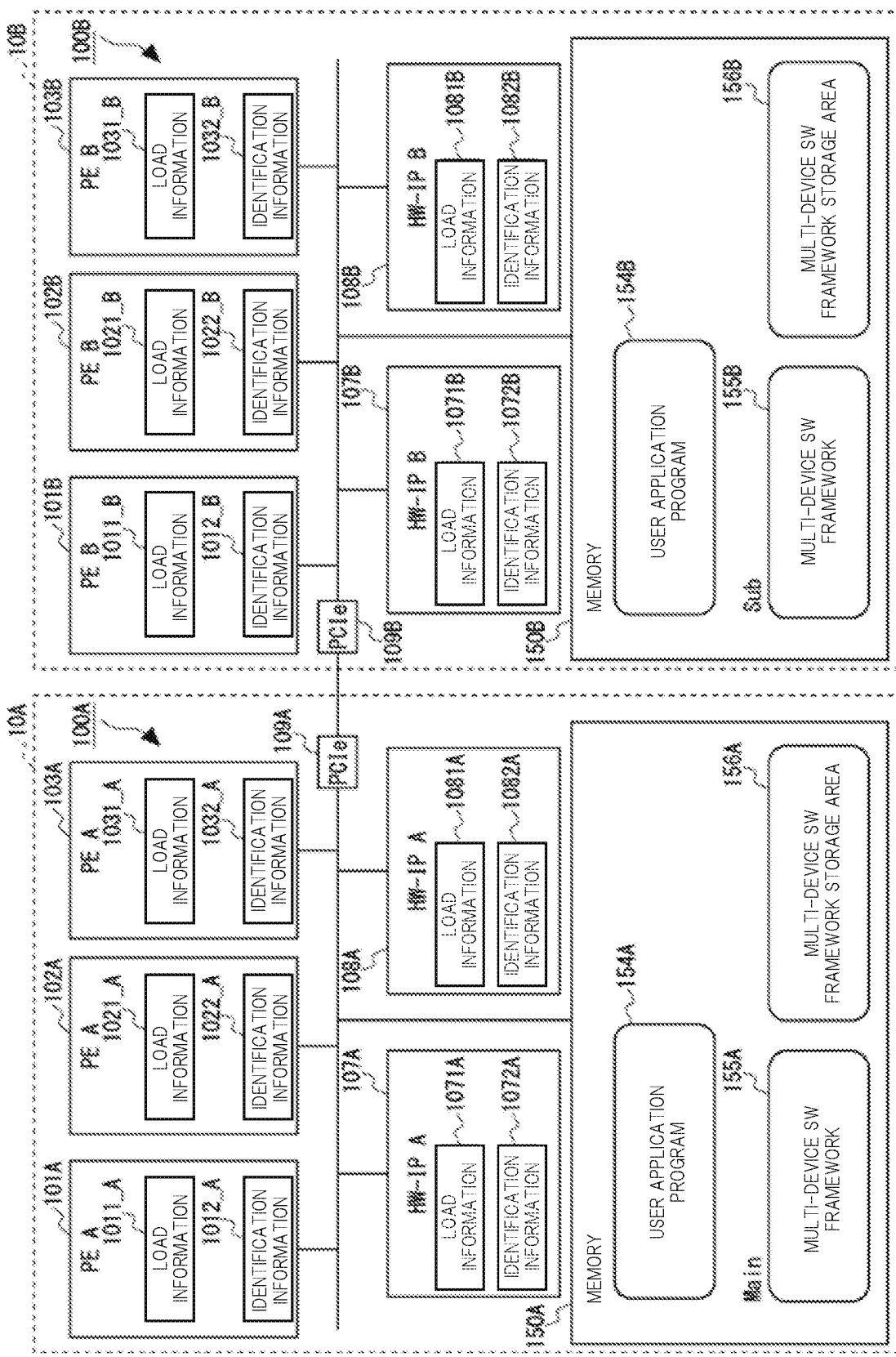
FIG. 2 illustrates a configuration example of a multi-device system according to a second embodiment.

FIG. 2 illustrates a multi-device system according to a second embodiment. The multi-device system includes the device 10A and the device 10B. Since the multi-device system includes a new fail mechanism suitable for the multi-device system as described below, the multi-device system may also be referred to as a fault operation control system in the present specification. The device 10A includes processor elements (hereinafter, referred to as PE) 101A to 103A, coprocessors (hereinafter, referred to as HW-IP) 107A and 108A that perform dedicated processing such as image processing, a PCIe 109A that is an interface for performing communication processing between devices, and a memory 150A. All the PEs 101A to 103A and the HW-IPs 107A and 108A are connected so as to be able to access the memory 150A. Note that, in the present specification, the PEs 101A to 103A and the HW-IPs 107A and 108A may be collectively referred to as a processor 100A.

Similarly, the device 10B includes PEs 101B to 103B, HW-IPs 107B and 108B that perform dedicated processing such as image processing, a PCIe 109B that is an interface for performing communication processing between devices, and a memory 150B. All the PEs 101B to 103B and the HW-IPs 107B and 108B are connected so as to be able to access the memory 150B. Note that, in the present specification, the PEs 101B to 103B and the HW-IPs 107B and 108B may be collectively referred to as a processor 100B.

Note that the multi-device system according to the present embodiment includes two devices 10A and 10B, but may include three or more devices (for example, 10A, 10B, 10C, . . . ) in other embodiments. Each device (for example, device 10A) according to this embodiment includes three PEs (for example, 101A to 103A), but the embodiment is not limited thereto, and each device may include any number of two or more PEs. In addition, each device (for example, device 10A) according to the present embodiment includes two HW-IPS (for example, 107A and 108A), but the embodiment is not limited thereto, and each device may include three or more HW-IPs. The device 10C may include a third processor and a memory.

In the present embodiment, the PEs 101A to 103A and the PEs 101B to 103B are different types of processor elements, and the HW-IPs 107A and 108A and the HW-IPs 107B and 118B are different types of coprocessors. That is, the processor 100A and the processor 100B may be heterogeneous processors having different specialized processing functions. The fault operation control system according to the embodiment is particularly effective in a heterogeneous multi-device system, but is also applicable to a homogeneous multi-device system.

As illustrated in FIG. 2, a user application program 154A, a multi-device SW framework 155A, and a multi-device SW framework storage area 156A are mounted on the memory 150A. Similarly, a user application program 154B, a multi-device SW framework 155B, and a multi-device SW framework storage area 156B are mounted on the memory 150B. Note that, in a multi-device system including three or more devices, each memory may have a corresponding configuration similar to that of the memory 150A.

Various tasks processed by each processor (for example, the processors 100A and 100B) are included in a user application program (for example, user application programs 154A and 154B). The user application program (for example, 154A and 154B) and a multi-device SW framework (for example, 156A and 156B) can be read and processed by each PE (for example, PEs 101A to 103A and PEs 101B to 103B). Also, one multi-device SW framework storage area (for example, 156A) can operate as a main frame, and the other multi-device SW framework storage area (for example, 156B) can operate as a subframe.

Figure 3:
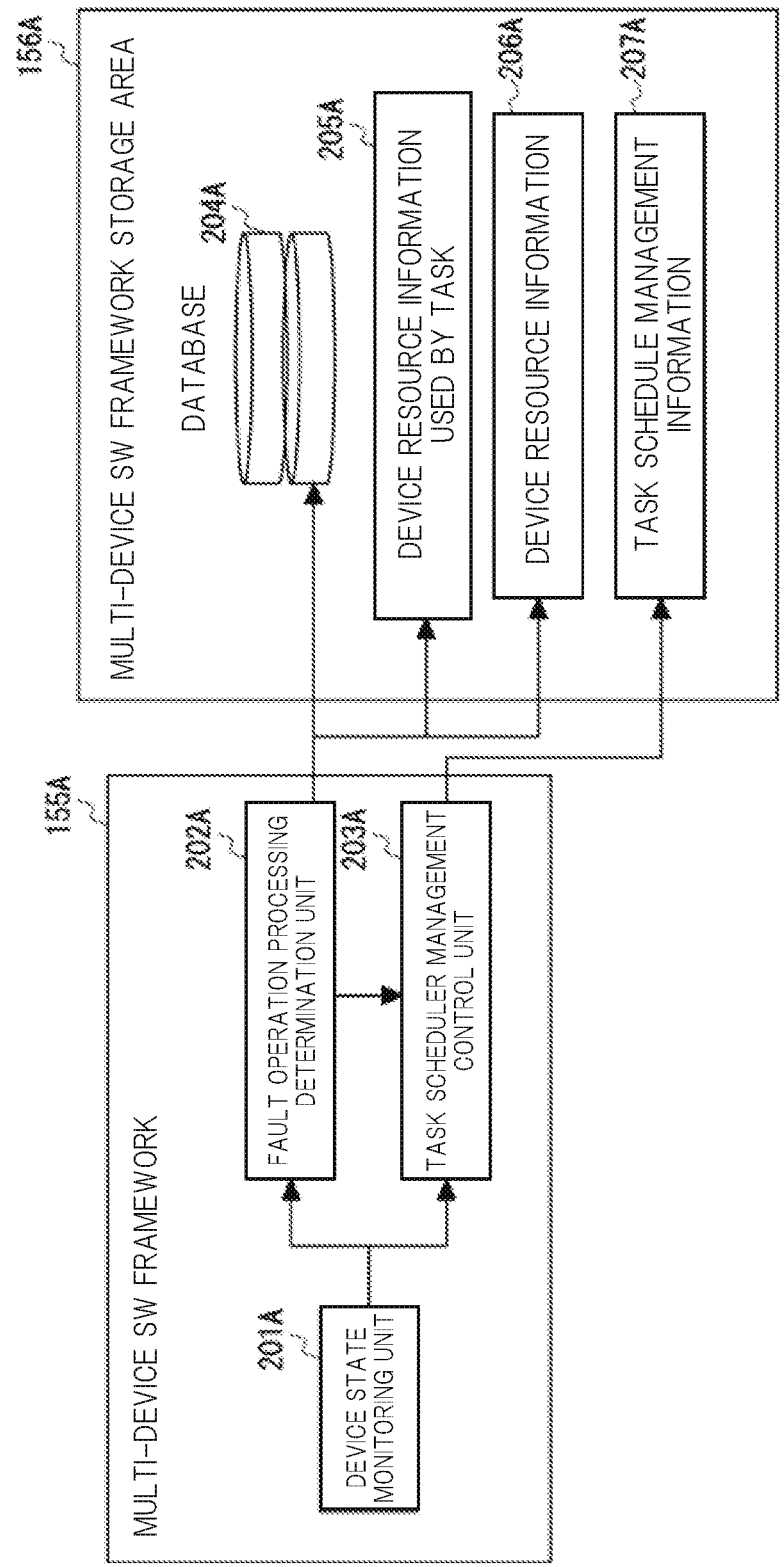
FIG. 3 illustrates a configuration example of a multi-device SW framework and a storage area thereof according to the second embodiment.

FIG. 3 illustrates a configuration of a multi-device SW framework according to the present embodiment. The multi-device SW framework 155A includes a device state monitoring unit 201A, a fault operation processing determination unit 202A, and a task scheduler management control unit 203A. The multi-device SW framework storage area 156A includes a database 204A that stores a countermeasure content and the like determined in advance according to difference information between respective devices (for example, the device 10A and the device 10B), device resource information 205A used by each task, and device resource information 206A of each device (for example, the device 10A and the device 10B). The difference information here refers to a difference between a resource of a certain device used by a task that is being executed or is scheduled to be executed by the device (for example, the device 10A) and a usable resource of a device that can save the task (for example, the device 10B, the device 10C, or the like).

Although not illustrated, the multi-device SW framework 155B of the device 10B includes a device state monitoring unit 201B, a fault operation processing determination unit 202B, and a task scheduler management control unit 203B, similarly to the multi-device SW framework 155A illustrated in FIG. 3. Although not illustrated, similarly to the multi-device SW framework storage area 156A illustrated in FIG. 3, the multi-device SW framework storage area 156B of the device 10B includes a database 204B that stores a countermeasure content or the like determined in advance according to difference information between the respective devices, device resource information 205B used by each task, and device resource information 206B of each device (for example, the device 10A and the device 10B).

In embodiments including three or more devices, other multi-device SW frameworks may be similar to the multi-device SW framework 155A described above, and other multi-device SW framework storage areas may be also similar to the multi-device SW framework storage areas 156A.

Figure 4:
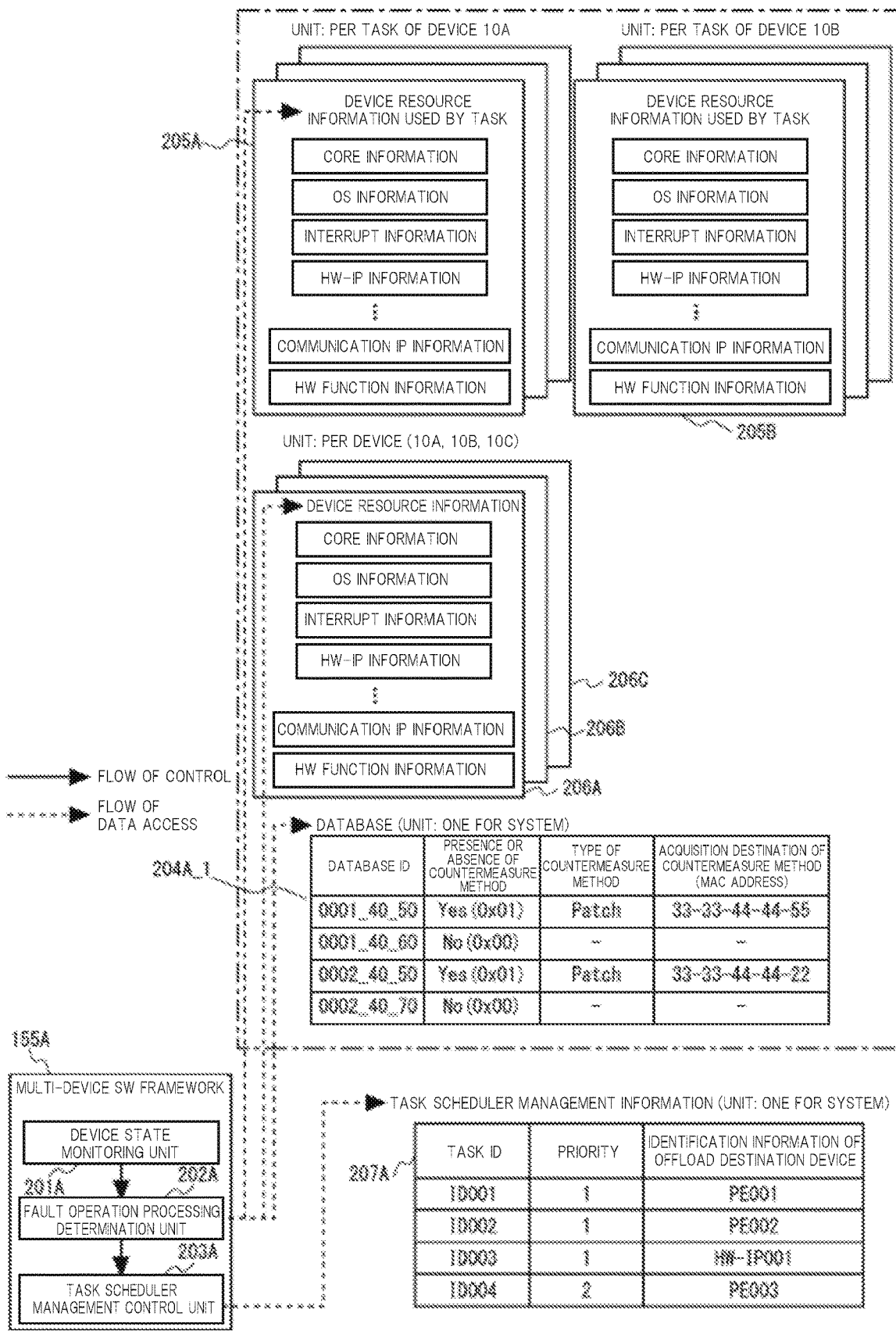
FIG. 4 illustrates a control flow, a data access flow, and a configuration example of a database of the multi-device SW framework according to the second embodiment.

FIG. 4 illustrates a data configuration of the multi-device SW framework and a processing flow and a data access flow of the multi-device SW framework. A database 204A 1 illustrated in FIG. 4 has a countermeasure method (for example, a countermeasure method corresponding to a difference between the devices 10A and 10B, a difference between the devices 10A and 10C, and a difference between the devices 10B and 10C) determined for each specification difference of each device.

The multi-device SW framework 155A includes the device state monitoring unit 201A, the fault operation processing determination unit 202A, and the task scheduler management control unit 203A as described above.

The device state monitoring unit 201A monitors the state of the device 10A, that is, the load state of the processor 100A, the presence or absence of a fault of the processor, and the like. The device state monitoring unit 201A stores the device resource information used by the task processed by the processor 100A in a device resource information 205A of the memory 150A and a device resource information 205B of the memory 150B. In another embodiment, the device state monitoring unit 201A may monitor the states of the device 10A and the device 10B, that is, the load states of the processor 100A and the processor 100B, the presence or absence of a fault of the processor, and the like.

Further, in the device resource information 205A of the memory 150A, as illustrated in FIG. 4, device resource information used by a task processed by the processor 100B of the device 10B is stored by the device state monitoring unit 201B of the device 10B. As a result, even when a fault occurs in the processor 100B of the device 10B, the processor 100A of the device 10A can acquire the task information processed by the processor 100B before the fault.

Examples of the device resource information 205A to be stored include core information, OS information, interrupt information, HW-IP information, communication IP information, and HW function information as illustrated in FIG. 4, but the embodiment is not limited thereto. In addition, these pieces of information can be used to identify any of a plurality of PEs or a plurality of HW-IPs in which a fault occurs. Such device resource information 205A is stored for each task of each device.

The device state monitoring unit 201A can transmit a Heartbeat signal to the PEs 101A to 103A and the HW-IPs 107A and 108A to check whether there is a fault in any of the PEs 101A to 103A or the HW-IPs 107A and 108A. When detecting a fault in any one of the PE and the HW-IP described above, the device state monitoring unit 201A notifies the fault operation processing determination unit 202A of identification information of the PE or the HW-IP in which the fault has occurred.

In another embodiment, the device state monitoring unit 201A may transmit the Heartbeat signal to the PEs 101A to 103A and the HW-IPs 107A and 108A described above and the PEs 101B to 103B and the HW-IP 107B of the device 10B. As a result, the device state monitoring unit 201A may check whether there is a fault in any of the PEs 101A to 103A or the HW-IPs 107A and 108A, and the PEs 101B to 103B and the HW-IP 107B.

Based on the "identification information of the PE or HW-IP in which the fault has occurred" transmitted from the device state monitoring unit 201A, the fault operation processing determination unit 202A can acquire the device resource information 205A used by the task that is being executed or is scheduled to be executed in the device 10B in which the fault has occurred from the multi-device SW framework storage area 156A.

Next, the fault operation processing determination unit 202A acquires the resource information of the device (the devices 10A, 10B, and 10C in FIG. 4) managed by the multi-device SW framework from the device resource information 206A. Next, the fault operation processing determination unit 202A compares the device resource information 205B used by the task being executed (or scheduled to be executed) in the fault destination device 10B with the resource information 206A of the device 10A managed by the multi-device SW framework. As a result of the comparison, when there is a device (for example, device 10A) having no resource difference, the device 10A is selected as a candidate of an offload destination of the task that has been being executed (or scheduled to be executed) by the fault destination device 10B, identification information of the device 10A is acquired, and the acquired identification information is notified to the task scheduler management control unit 203A.

As a result of the comparison, when there is no device having no resource difference and a countermeasure method for offloading the task cannot be acquired from the database 204, the fault operation processing determination unit 202 determines that there is no other device capable of alternatively processing the device resource information 205B used by the task being executed (or scheduled to be executed) by the fault destination device 10B. Therefore, the task scheduler management control unit 203A is notified that fail-safe processing for safely stopping the multi-device system is performed.

When a fault does not occur in the multi-device system managed by the multi-device SW framework, the task scheduler management control unit 203A determines a device to which the task is offloaded based on the load information of the device acquired from the device state monitoring unit 201A.

Note that, regarding the configuration of the database 204, two examples of a configuration having a countermeasure method for each specification difference of each device (described with reference to FIG. 4) and a configuration managing a countermeasure method in a case of operating each device for each task (described below with reference to FIG. 5) are considered.

Figure 5:
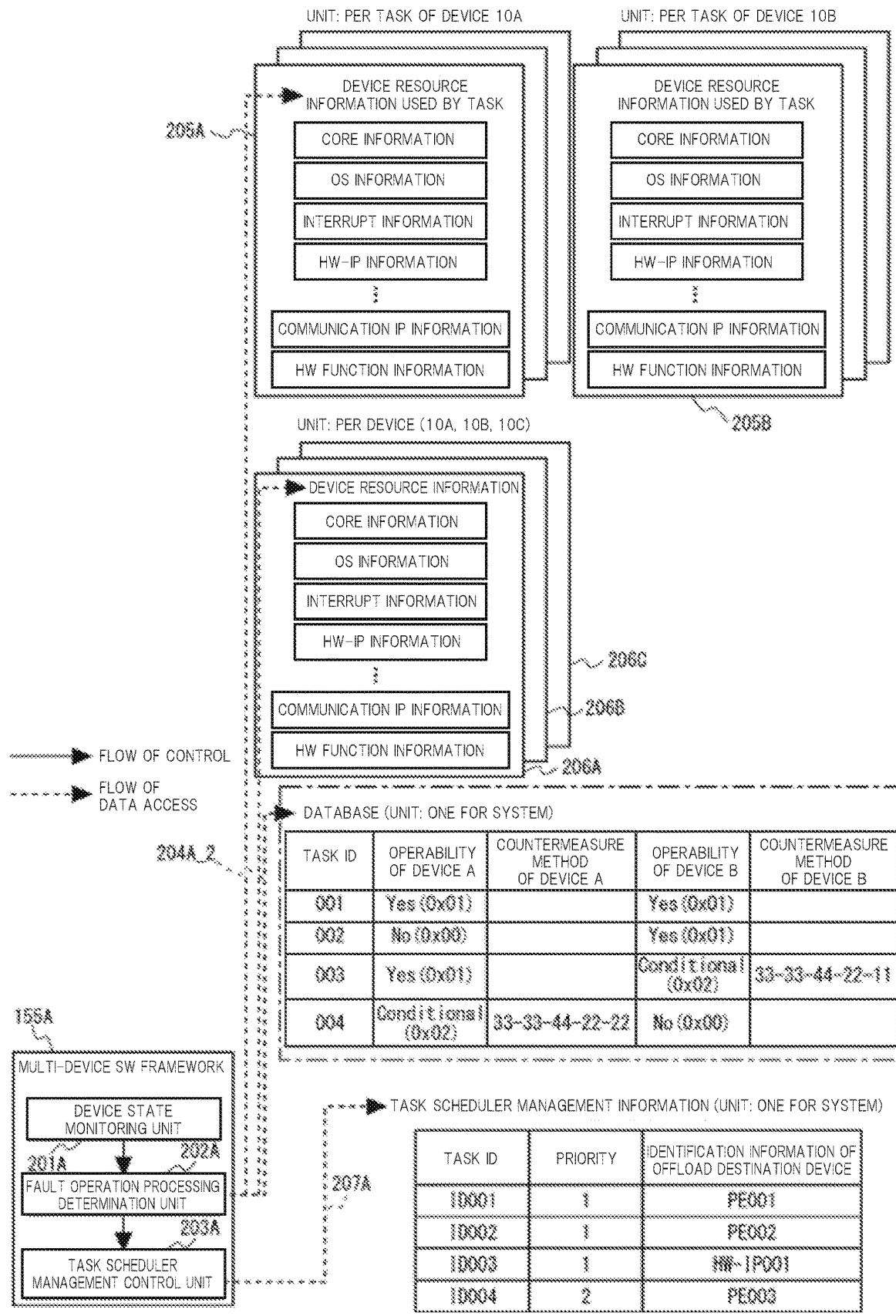
FIG. 5 illustrates a control flow, a data access flow, and another configuration example of a database of the multi-device SW framework according to the second embodiment.

FIG. 5 illustrates a control flow, a data access flow, and another configuration example of a database of a multi-device SW framework. Unlike the database illustrated in FIG. 4, the database illustrated in FIG. 5 manages a countermeasure method in the case of operating each device for each task.

The example of the database having the countermeasure method for each device specification difference illustrated in FIG. 4 and the example of the database having the countermeasure method for each task illustrated in FIG. 5 can have the following merits and demerits.

Since the example illustrated in FIG. 4 has a countermeasure method for each specification difference between the devices (for example, a specification difference between the device 10A and the device 10B, and, if any, a specification difference between the device 10A and the device 10C), it is possible to closely cope with a fine specification difference between the devices. In addition, the frequency of updating the database information illustrated in FIG. 4 is at the time of initialization of the multi-device SW FMK and the timing of adding a device to be placed under the management of the multi-device SW FMK, and it is assumed that the update frequency of the database is lower than that of the database illustrated in FIG. 5. Therefore, in the example of the database illustrated in FIG. 4, the overhead required for updating the database is reduced as compared with the example of the database illustrated in FIG. 5.

However, in the case of the example of the database illustrated in FIG. 4, a countermeasure method focusing on the specification difference of the device is managed, and the processing content of the task being executed or scheduled to be executed is not considered. Therefore, optimization according to the processing content of the task cannot be performed.

Meanwhile, in the case of the example of the database illustrated in FIG. 5, since an optimal countermeasure method for each device is provided as a database by focusing on the processing contents of the task, it is possible to cope with the processing contents of the task being executed or scheduled to be executed optimally in terms of performance.

However, in the case of the example of the database illustrated in FIG. 5, the update of the database information requires not only the initialization of the multi-device SW FMK but also the timing of adding the application under the management of the multi-device SW FMK. Therefore, it is assumed that the frequency of updating the database information is higher than the frequency of updating the database in the example of the database illustrated in FIG. 4. Therefore, in the example of the database illustrated in FIG. 5, the overhead required for updating the database is increased as compared with the example illustrated in FIG. 4.

Figure 6A:
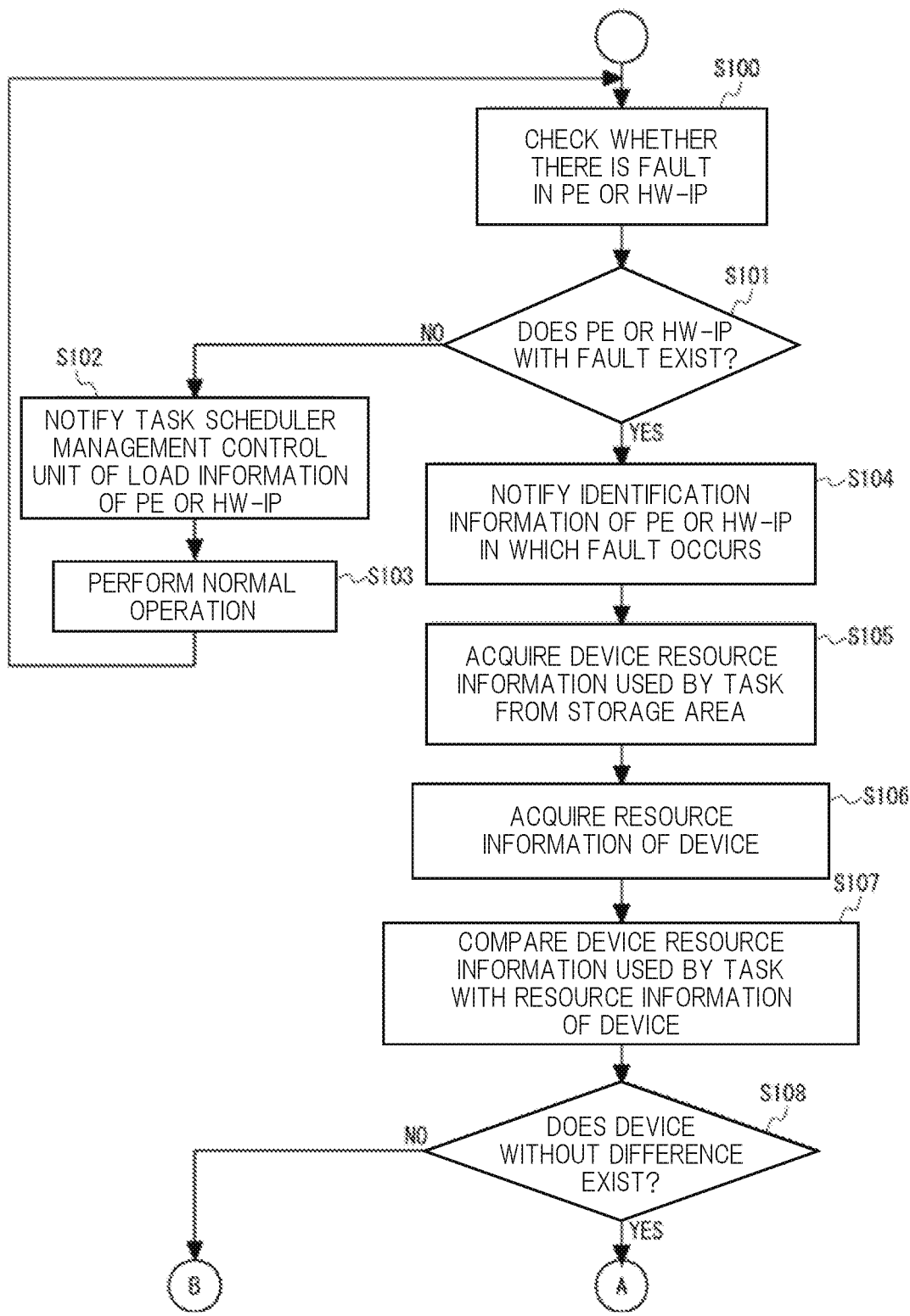
FIG. 6A illustrates an operation flow of a fault operation control method according to the second embodiment.
Figure 6B:
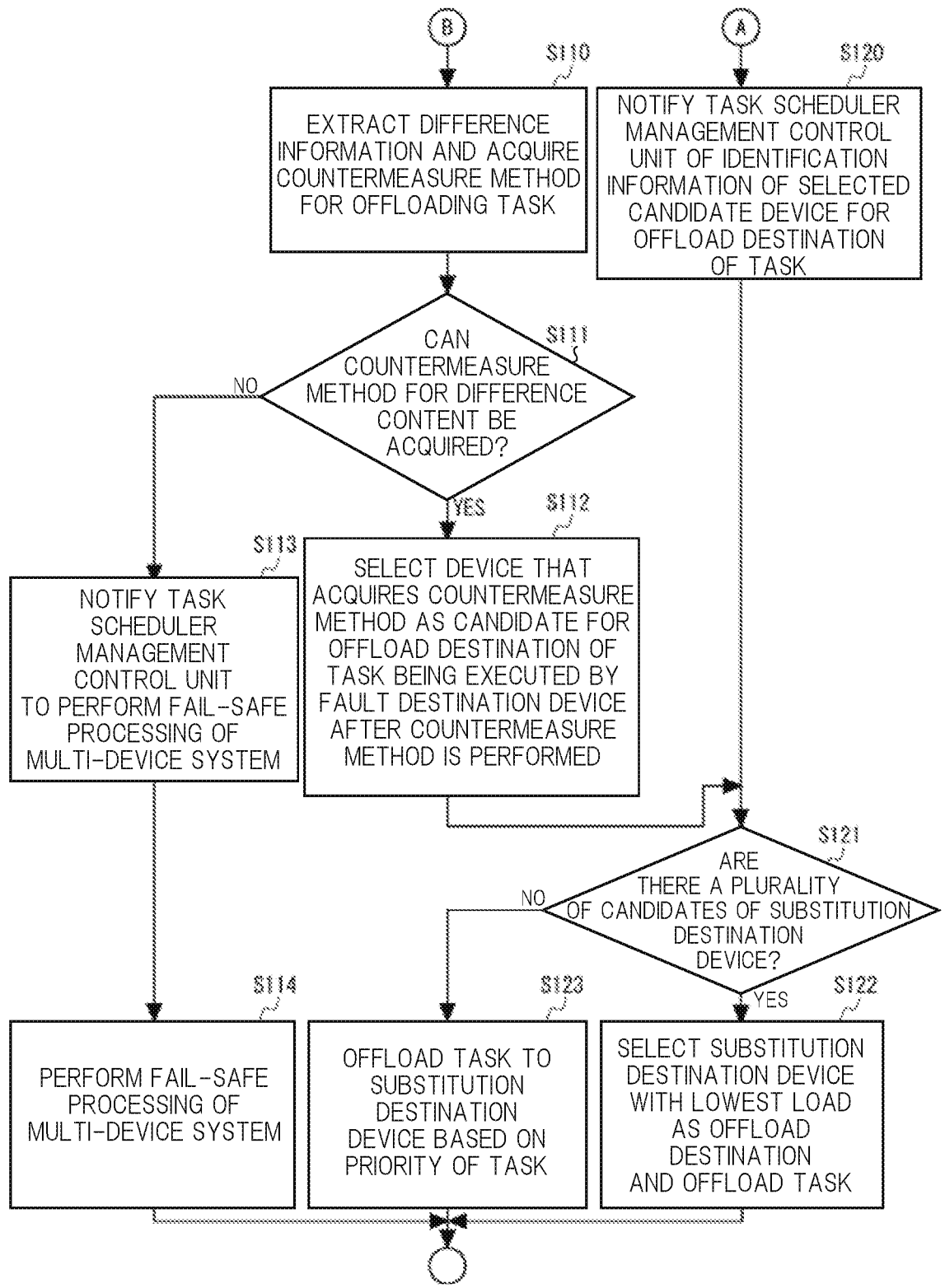
FIG. 6B illustrates an operation flow of the fault operation control method according to the second embodiment.

FIGS. 6A and 6B illustrate an operation flow of a fault operation control method according to the present embodiment. Specifically, an operation flow of the multi-device SW framework is shown. The device state monitoring unit 201A is automatically activated at intervals with a certain cycle. The device state monitoring unit 201A transmits a Heartbeat signal to the PEs 101A to 103A and the HW-IPs 107A and 108A and check whether there is a fault in any of the PEs 101A to 103A or the HW-IPs 107A and 108A (step S100). Also, the device state monitoring unit 201A transmits a Heartbeat signal to the PEs 101B to 103B and the HW-IPs 107B and 108B and check whether there is a fault in any of the PEs 101B to 103B or the HW-IPs 107B and 108B (step S100).

When it is confirmed that there is no fault in the PEs 101A to 103A and the HW-IPs 107A and 108A and that there is no fault in the PEs 101B to 103B and the HW-IPs 107B and 108B (NO in step S101), the device state monitoring unit 201A acquires load information of the PEs or the HW-IPs and notifies the task scheduler management control unit 203A of the load information (step S102). The device state monitoring units can share the load information with each other by storing the load information of its own PE or HW-IP not only in the memory of its own device but also in the memory of another device. For example, the device state monitoring unit 201A can share the load information by storing the load information of its own PEs 101A to 103A or the HW-IPs 107A and 108A not only in the memory 150A of its own device 10A but also in the memory 150B of another device 10B. Details are described below with reference to FIG. 4. Similarly, the device state monitoring unit 201B can share the load information by storing the load information of its own PEs 101B to 103B or the HW-IPs 107B and 108B not only in the memory 150B of its own device 10B but also in the memory 150A of another device 10A. Next, a normal operation is performed (step S103).

Meanwhile, when detecting a fault in any one of the PE and the HW-IP described above (YES in step S101), the device state monitoring unit 201A notifies the fault operation processing determination unit 202A of identification information of the PE or the HW-IP in which the fault has occurred (step S104). In this example, an example in which a fault with respect to any one of the PEs 101B to 103B or the HW-IPs 107B and 108B of the device 10B is detected is described.

Based on the "identification information of the PE or HW-IP in which the fault has occurred" transmitted from the device state monitoring unit 201A, the fault operation processing determination unit 202A acquires the device resource information 205B used by the task that is being executed or is scheduled to be executed in the device 10B in which the fault has occurred from the multi-device SW framework storage area 156A (step S105).

Next, the fault operation processing determination unit 202A acquires the resource information of the device managed by the multi-device SW framework 155A from the device resource information 206 (step S106). Next, the fault operation processing determination unit 202A compares the device resource information used by the task being executed (or scheduled to be executed) in the fault destination device 10B with the resource information of the device managed by the multi-device SW framework (step S107).

As a result of the comparison, when there is a device (for example, the device 10A) having no resource difference (YES in step S108), the fault operation processing determination unit 202A selects the device (for example, the device 10A) as a candidate for an offload destination of a task that has been being executed (or scheduled to be executed) by the fault destination device (for example, the device 10B), acquires identification information regarding the task, and notifies the task scheduler management control unit 203A of the identification information (step S120).

As a result of the comparison, when there is no device having no difference (NO in step S108), the fault operation processing determination unit 202A extracts difference information and attempts to acquire a countermeasure method for offloading the task that is being executed (or scheduled to be executed) by the fault destination device (for example, 10B) from the database 204A (step S110). The fault operation processing determination unit 202A generates an ID for database reference based on the information in which the difference has occurred and accesses the database 204A. When the countermeasure is acquired from the database 204A (YES in step S111), the fault operation processing determination unit 202A performs a procedure according to the countermeasure method acquired from the database 204A. Thereafter, the device 10A from which the countermeasure method has been acquired is selected as a candidate for an offload destination of the task that is being executed (or scheduled to be executed) by the fault destination device 10B, and identification information is acquired and notified to the task scheduler management control unit 203A (step S112).

As a result of the comparison, when there is no device having no resource difference (NO in step S108), and a countermeasure method for offloading the task cannot be acquired from the database 204 (NO in step S111), since there is no device capable of alternatively processing the task that is being executed (or scheduled to be executed) by the fault destination device 10B, the fault operation processing determination unit 202A notifies the task scheduler management control unit 203A to perform fail-safe processing for safely stopping the multi-device system (step S113). The task scheduler management control unit 203A activates a dedicated task for performing the fail-safe processing for safely stopping the multi-device system (step S114).

When a fault does not occur in the multi-device system managed by the multi-device SW framework, the task scheduler management control unit 203A determines a device to which the task is offloaded based on the load information of the device acquired from the device state monitoring unit 201A.

When it is detected in the above-described flow that any device on the multi-device system commits a fault, and the task scheduler management control unit 203A receives the identification information of a substitution destination device of the task to be executed by the fault destination device from the fault operation processing determination unit 202A, the task scheduler management control unit 203A changes the offload destination of the task to be executed by the fault destination device 10B to the substitution destination device 10A and offloads the task to the substitution destination device based on the priority of the task (step S123).

When there is identification information of a plurality of substitution destination devices (for example, devices 10A and 10C) of the task executed by the fault destination device 10B (YES in step S121), the task scheduler management control unit 203A acquires load information of each substitution destination device (for example, devices 10A and 10C) from the device state monitoring unit 201A (step S122). The task scheduler management control unit 203A selects the substitution destination device (for example, the device 10A) with the lowest load as an offload destination of the task and then offloads the task (step S122).

Note that, in the present disclosure, the description of the behavior of the task scheduler management control unit when there is no fault is omitted because the fault operation processing when a fault is detected is targeted.

As illustrated in FIG. 3, a fault operation control device (also referred to as a multi-device software framework) according to the second embodiment includes a device state monitoring unit 201, a fault operation processing determination unit 202, and a task scheduler management control unit 203 (note that, since the devices have similar configurations, A, B, C, . . . for identifying the devices are omitted).

Specifically, the device state monitoring unit 201 monitors whether there is a fault of a device to be managed by the multi-device SW framework at regular intervals. When a fault is detected, the fault operation processing determination unit 202 determines a procedure for the fault. The task scheduler management control unit 203 determines the offload destination of the task based on the load information of the device notified from the device state monitoring unit 201 or the fault operation processing determination unit 202 and the identification information of the substitution destination device. In addition, the fault operation control device according to the second embodiment compares the device resource information 205 used by the task with the device resource information 206 and extracts resource difference information. Further, the fault operation control device refers to the database 204 based on the database ID generated from the difference information, acquires a countermeasure method for the difference information, and takes a countermeasure for the difference. With the features of the present disclosure, a degeneracy operation can be performed without adding an HW resource even in a multi-device system having a heterogeneous configuration.

In the above embodiment, the case where the fault occurs in the device 10B is described, but, the present disclosure is similarly applicable also to a case where the fault occurs in another device such as the device 10A or the device 10C.

Third Embodiment

Figure 7:
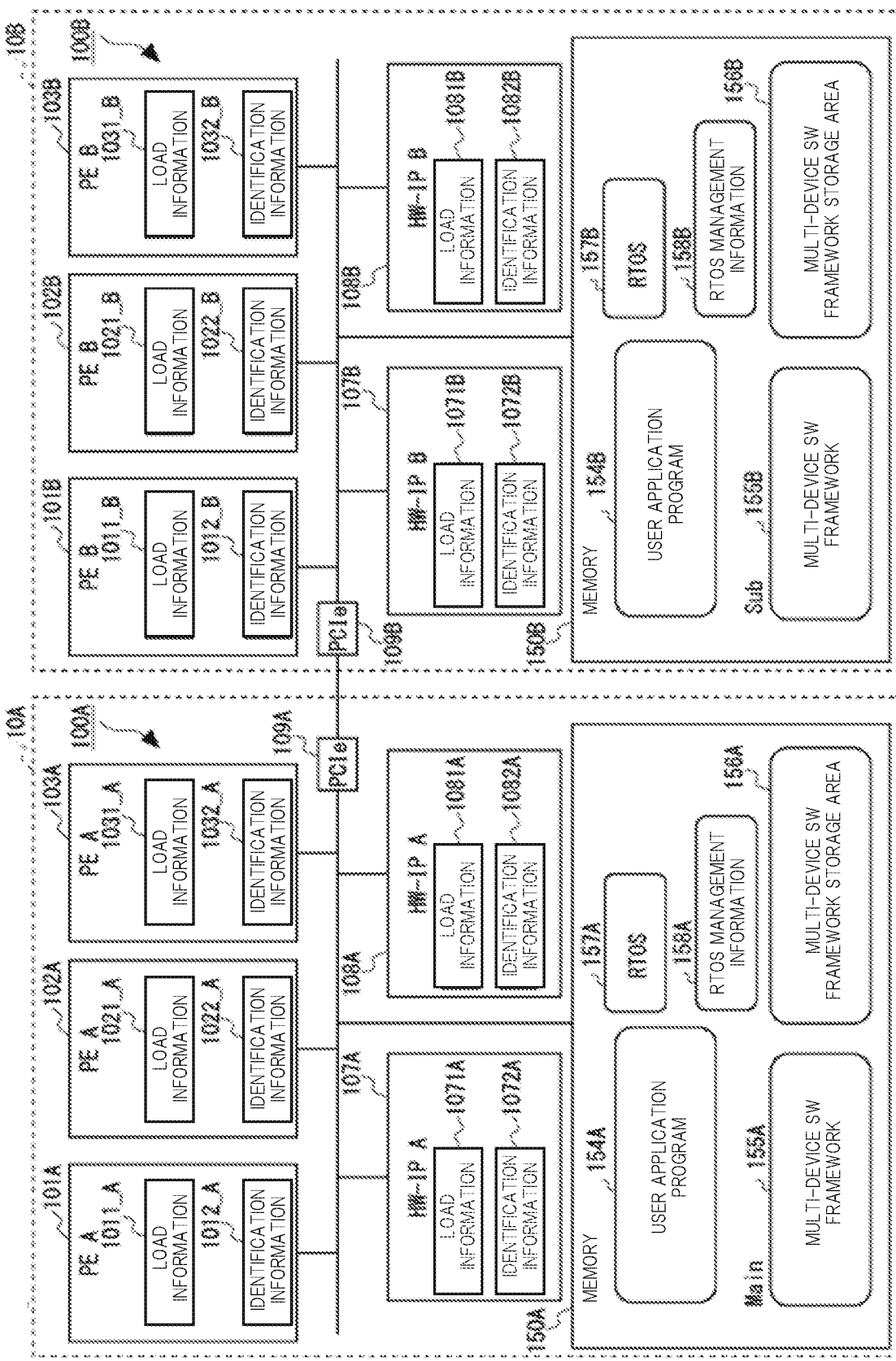
FIG. 7 illustrates a configuration example of a multi-device system according to a third embodiment.

FIG. 7 illustrates a configuration example of a multi-device system according to a third embodiment. In the multi-device system according to the third embodiment, real-time operating systems (RTOS) 154A and 154B and RTOS management information 158A and 158B are added to the memories 150A and 150B according to the third embodiment. Other configurations are similar to those in FIG. 2, and thus detailed description thereof is omitted.

Figure 8:
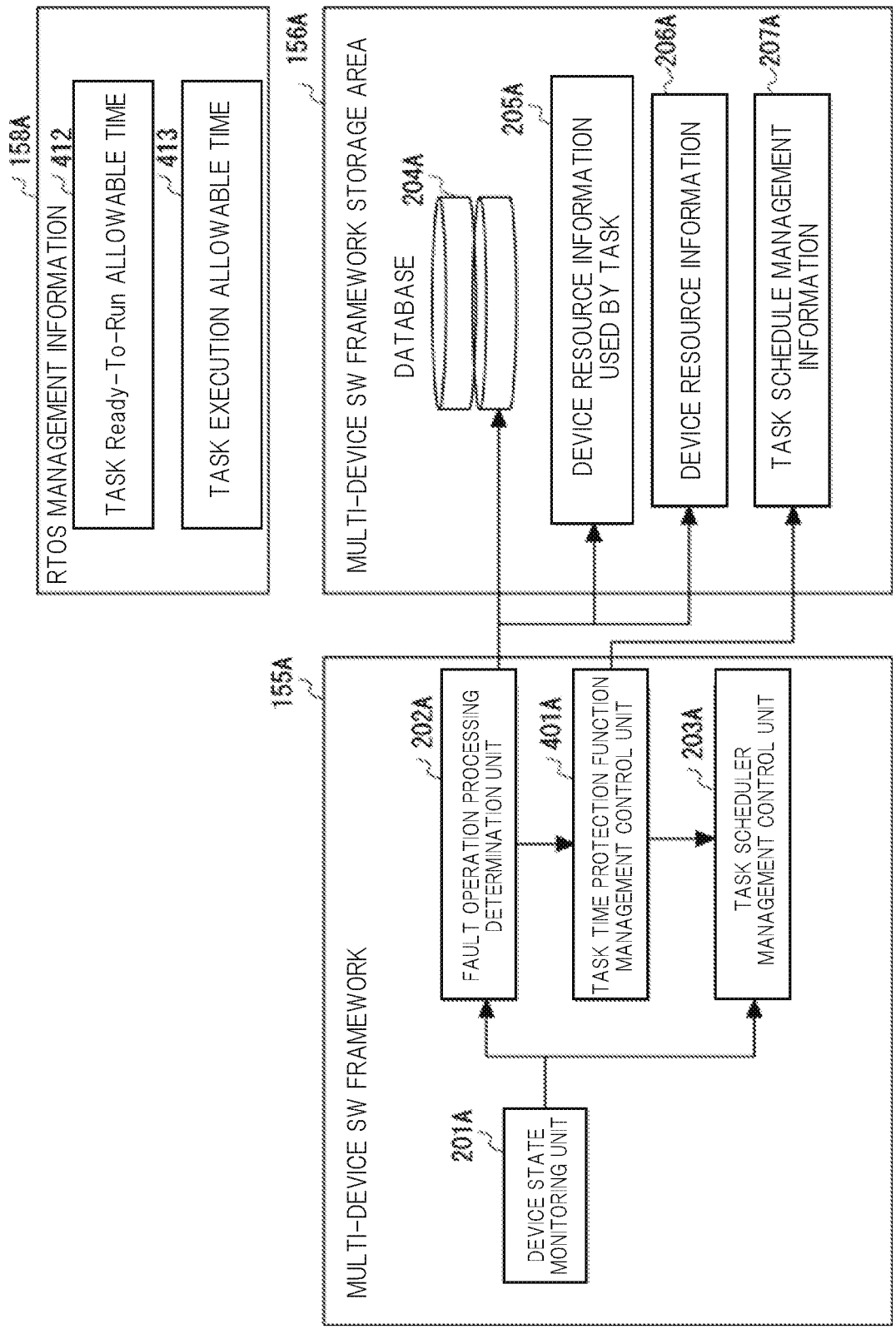
FIG. 8 illustrates a configuration example of a multi-device SW framework and a storage area thereof according to the third embodiment.

FIG. 8 illustrates a configuration of a multi-device SW framework according to the third embodiment. In the device 10A, a task time protection function management control unit 401A is added to the multi-device SW framework 155A. In addition, a Ready-to-Run allowable time 412 of the task and an execution allowable time 413 of the task of the RTOS management information 158A are added. Other configurations are similar to those in FIG. 3, and thus detailed description thereof is omitted.

Although not illustrated, in the device 10B, a task time protection function management control unit 401B is added to the multi-device SW framework 155B. In addition, a Ready-to-Run allowable time 412B of the task and an execution allowable time 413B of the task of the RTOS management information 158B are added.

Figure 9:
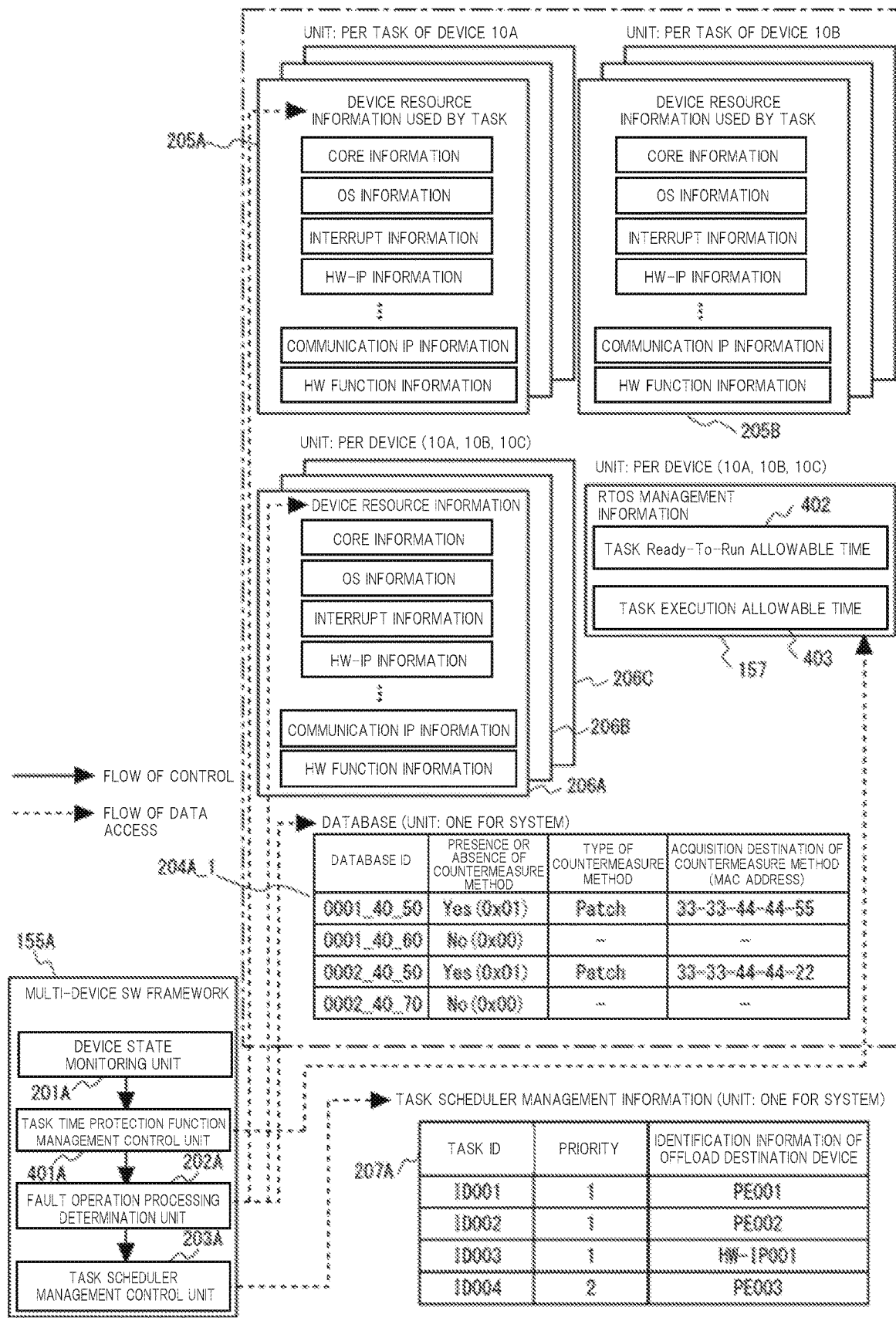
FIG. 9 illustrates a control flow, a data access flow, and a configuration example of a database of the multi-device SW framework according to the third embodiment.

FIG. 9 illustrates a data configuration of the multi-device SW framework and a processing flow and a data access flow of the multi-device SW framework according to the third embodiment. In FIG. 9, RTOS management information is added to the configuration of the data illustrated in FIG. 4. The RTOS management information includes a Ready-to-Run allowable time 402 of the task and an execution allowable time 403 of the task.

Figure 10A:
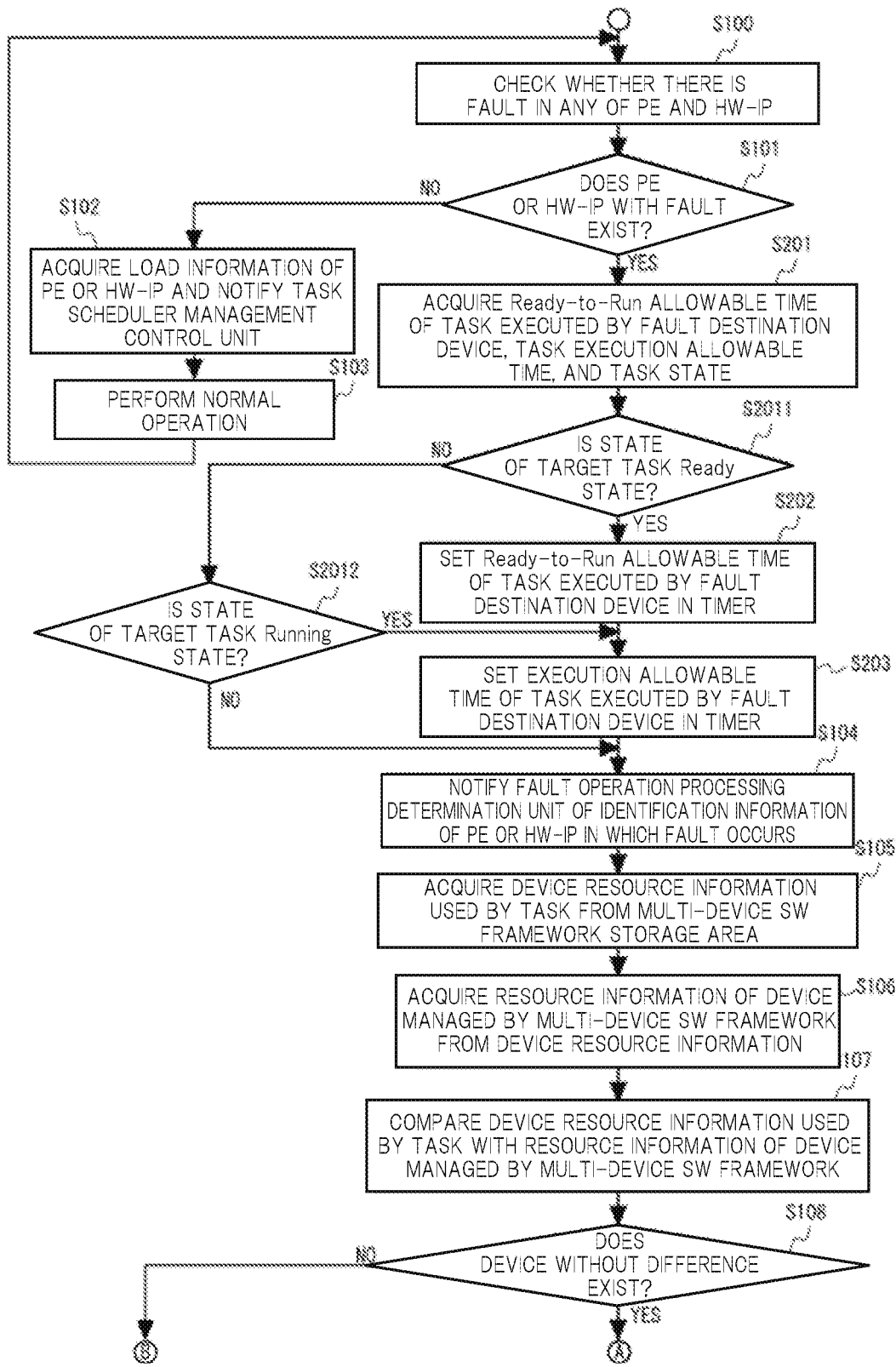
FIG. 10A illustrates an operation flow of a fault operation control method according to the third embodiment.
Figure 10B:
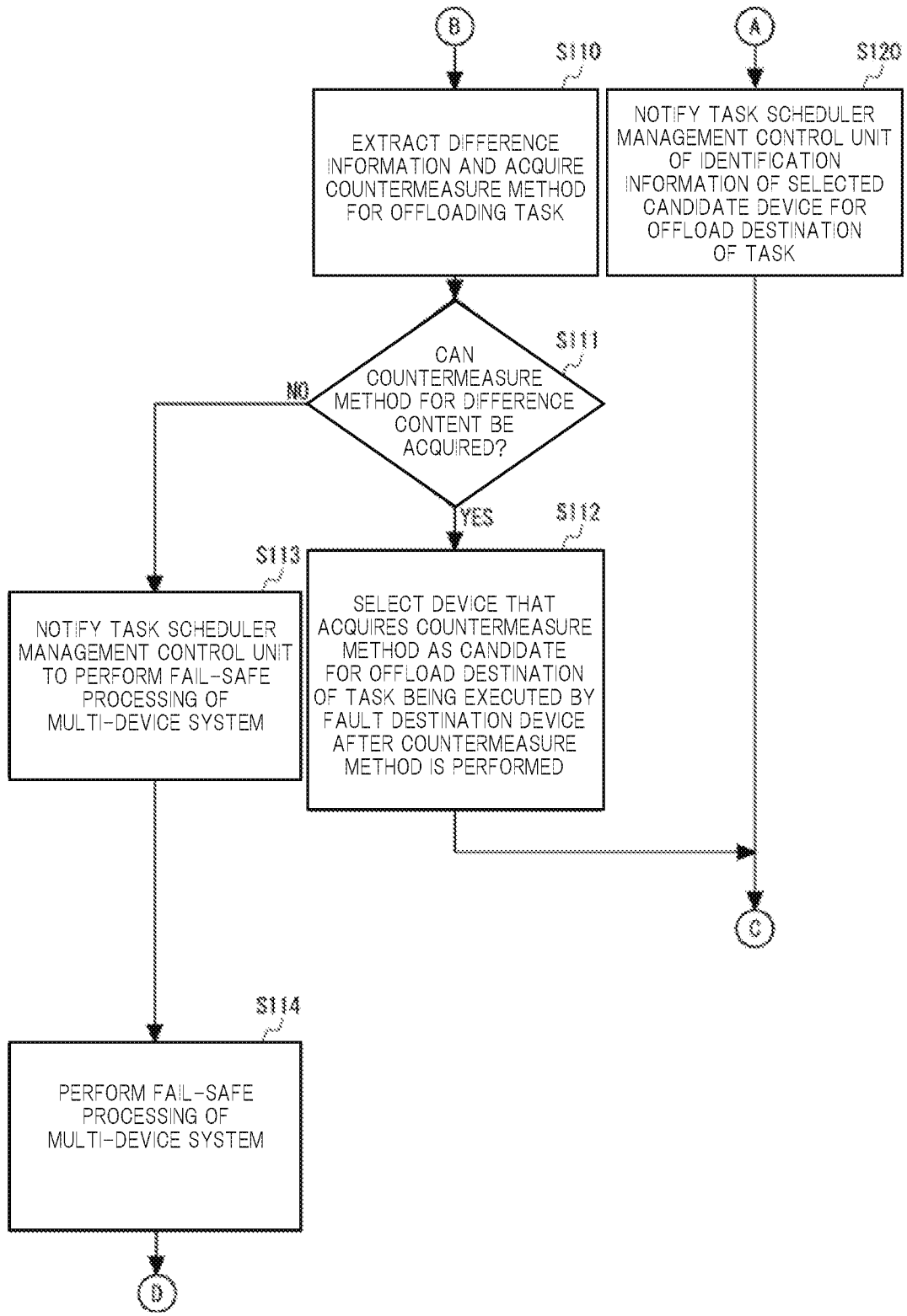
FIG. 10B illustrates the operation flow of the fault operation control method according to the third embodiment.
Figure 10C:
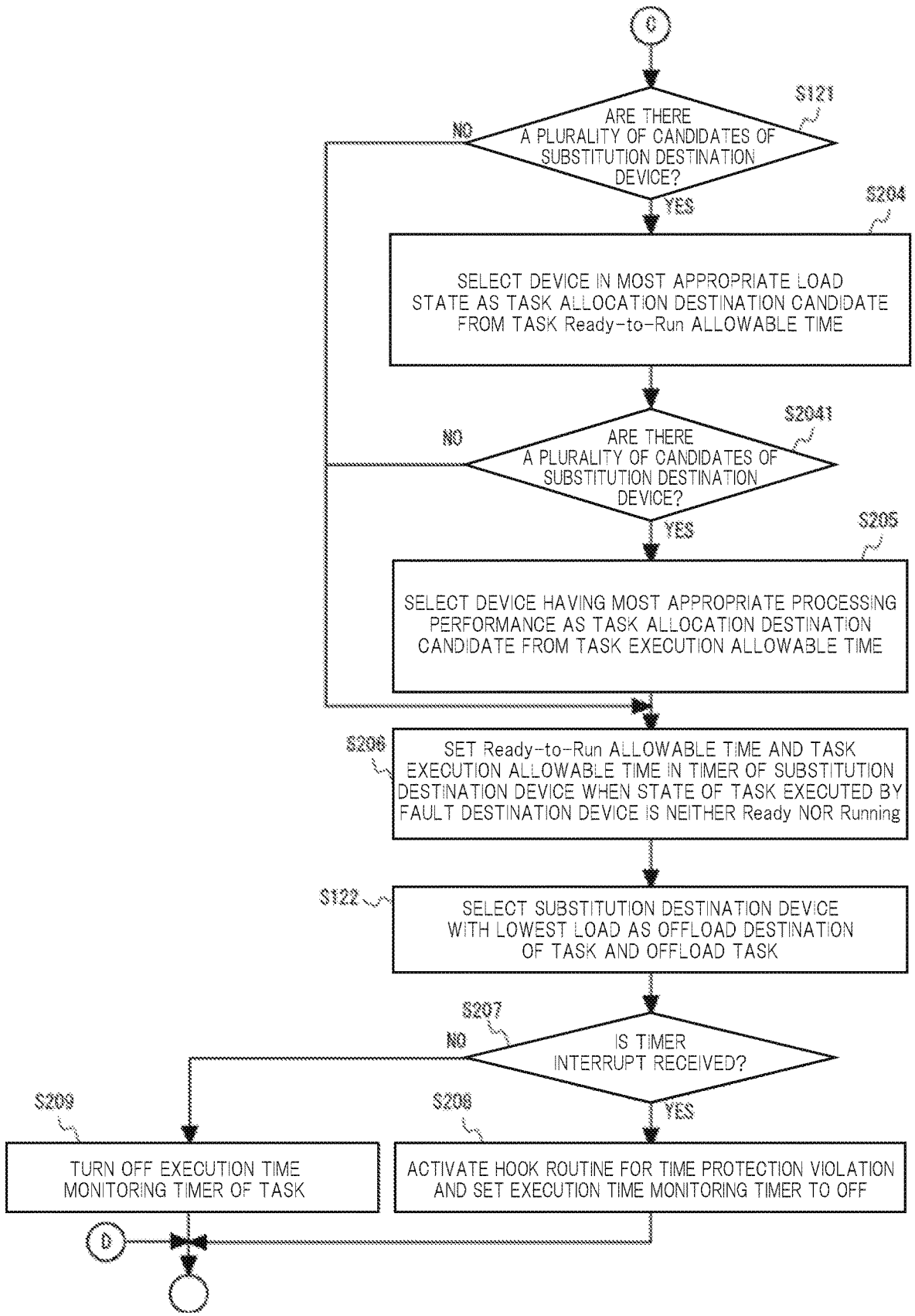
FIG. 10C illustrates the operation flow of the fault operation control method according to the third embodiment.

FIGS. 10A to 10C illustrate an operation flow of the multi-device SW framework according to the third embodiment. In the present third embodiment, in addition to the operation of the second embodiment, immediately after the device state monitoring unit 201A detects the fault, the task time protection function management control unit 401A acquires the Ready-to-Run allowable time 402 of the task executed by the fault destination device 10B, the execution allowable time 403 of the task, and task state 404 from RTOS management information 157 of the fault destination device 10B. Next, when the task is in the Ready state, the task time protection function management control unit 401A sets the Ready-to-Run allowable time 402 of the task to be executed by the fault destination device 10B in the timer. When the task is in the Running state, the task time protection function management control unit 401 sets the execution allowable time 403 of the task executed by the fault destination device 10B in the timer.

In addition, after fault operation processing the determination unit 202 acquires the identification information of the device as the candidate for the substitution destination (for example, devices 10A or 10C), the task scheduler management control unit 203A selects a device (for example, device 10A or 10C) assumed to be within the Ready-to-Run allowable time 402 of the task as a task allocation destination candidate.

When there is still a plurality of task allocation destination candidates and there is a plurality of items of identification information of the substitution destination device of the task executed by the fault destination device, the task scheduler management control unit 203 selects a device having the highest processing performance as the task allocation destination candidate from the execution allowable time 403 of the task. Next, when the state of the task executed by the fault destination device is neither Ready nor Running, the task time protection function management control unit 401 sets the Ready-to-Run allowable time 402 and the execution allowable time 403 of the task in the timer of the substitution destination device. Finally, the multi-device SW framework activates the hook routine for the time protection violation when accepting an interrupt from a task execution time monitoring timer, sets the execution time monitoring timer to OFF, and turns off the task execution time monitoring timer without activating the hook routine for the time protection violation when receiving the termination notification of the fault destination task before accepting the interrupt from the task execution time monitoring timer.

The operation flow is specifically described with reference to FIGS. 10A to 10C.

The device state monitoring unit 201A is automatically activated at intervals with a certain cycle. The device state monitoring unit 201A transmits a Heartbeat signal to the PEs 101A to 103A and the HW-IPs 107A and 108A and check whether there is a fault in any of the PEs 101A to 103A or the HW-IPs 107A and 108A (step S100). Also, the device state monitoring unit 201A transmits a Heartbeat signal to the PEs 101B to 103B and the HW-IPs 107B and 108B and check whether there is a fault in any of the PEs 101B to 103B or the HW-IPs 107B and 108B (step S100).

When it is confirmed that there is no fault in the PEs 101A to 103A and the HW-IPs 107A and 108A and that there is no fault in the PEs 101B to 103B and the HW-IPs 107B and 108B (NO in step S101), the device state monitoring unit 201A acquires load information of the PEs or the HW-IPs and notifies the task scheduler management control unit 203A of the load information (step S102). The device state monitoring units can share the load information with each other by storing the load information of its own PE or HW-IP not only in the memory of its own device but also in the memory of another device. For example, as described with reference to FIG. 4, the device state monitoring unit 201A can share the load information by storing the load information of its own PEs 101A to 103A or the HW-IPs 107A and 108A not only in the memory 150A of its own device 10A but also in the memory 150B of another device 10B. Similarly, the device state monitoring unit 201B can share the load information by storing the load information of its own PEs 101B to 103B or the HW-IPs 107B and 108B not only in the memory 150B of its own device 10B but also in the memory 150A of another device 10A. Next, a normal operation is performed (step S103).

Meanwhile, when the device state monitoring unit 201A detects a fault in any one of the PE and the HW-IP described above (YES in step S101), the task time protection function management control unit 401A acquires the Ready-to-Run allowable time 402B of the task executed by the fault destination device 10B, the execution allowable time 403B of the task, and the task state 404B from the RTOS management information 157 related to the fault destination device 10B (step S201).

Next, the task time protection function management control unit 401A determines whether a state of a target task is a Ready state (step S2011).

When the state of the target task is the Ready state (YES in step S2011), the task time protection function management control unit 401A sets the Ready-to-Run allowable time 402 of the task executed by the fault destination device 10B in the timer (step S202).

The task time protection function management control unit 401 sets the execution allowable time 403B of the task executed by the fault destination device 10B in the timer (step S203).

Meanwhile, when the state of the target task is not the Ready state (NO in step S2011), the task time protection function management control unit 401 determines whether the state of the target task is the Running state (step S2012). When the state of the target task is the Running state (YES in step S2012), the task time protection function management control unit 401 sets the execution allowable time 403B of the task executed by the fault destination device 10B in the timer in step S203 without passing through step S202 (step S203). When the state of the target task is not the Running state (NO in step S2012), the processing proceeds to step S104 without passing through steps S202 and S203.

The device state monitoring unit 201A notifies the fault operation processing determination unit 202A of the identification information of the PE or HW-IP in which the fault occurs (step S104). In this example, an example in which a fault with respect to any one of the PEs 101B to 103B or the HW-IPs 107B and 108B of the device 10B is detected is described.

Based on the "identification information of the PE or HW-IP in which the fault has occurred" transmitted from the device state monitoring unit 201A, the fault operation processing determination unit 202A acquires the device resource information 205B used by the task that is being executed or is scheduled to be executed in the device 10B in which the fault has occurred from the multi-device SW framework storage area 156A (step S105).

Next, the fault operation processing determination unit 202A acquires the resource information of the device managed by the multi-device SW framework 155A from the device resource information 206 (step S106). Next, the fault operation processing determination unit 202A compares the device resource information used by the task being executed (or scheduled to be executed) in the fault destination device 10B with the resource information of the device managed by the multi-device SW framework (step S107).

As a result of the comparison, when there is a device (for example, the device 10A) having no resource difference (YES in step S108), the fault operation processing determination unit 202A selects the device (for example, the device 10A) as a candidate for an offload destination of a task that has been being executed (or scheduled to be executed) by the fault destination device (for example, the device 10B), acquires identification information regarding the task, and notifies the task scheduler management control unit 203A of the identification information (step S120).

Meanwhile, as a result of the comparison, when there is no device having no difference of the resource (NO in step S108), the fault operation processing determination unit 202A extracts difference information and attempts to acquire a countermeasure method for offloading a task that is being executed (or scheduled to be executed) by the fault destination device 10B from the database 204A (step S110). The fault operation processing determination unit 202A generates an ID for database reference based on the information in which the difference has occurred and accesses the database 204A. When the countermeasure method has been acquired from the database 204A (YES in step S111), the fault operation processing determination unit 202A performs a procedure according to the countermeasure method acquired from the database 204A, then selects the device 10A that has acquired the countermeasure method as a candidate for an offload destination of the task that has been being executed (or scheduled to be executed) by the fault destination device 10B, acquires identification information, and notifies the task scheduler management control unit 203A of the identification information (step S112).

As a result of the comparison, when there is no device having no resource difference (NO in step S108), and a countermeasure method for offloading the task cannot be acquired from the database 204 (NO in step S111), since there is no device capable of alternatively processing the task that is being executed (or scheduled to be executed) by the fault destination device 10B, the fault operation processing determination unit 202A notifies the task scheduler management control unit 203A to perform fail-safe processing for safely stopping the multi-device system (step S113). The task scheduler management control unit 203A activates a dedicated task for performing the fail-safe processing for safely stopping the multi-device system (step S114).

When a fault does not occur in the multi-device system managed by the multi-device SW framework, the task scheduler management control unit 203A determines a device to which the task is offloaded based on the load information of the device acquired from the device state monitoring unit 201A.

Meanwhile, after step S112 or step S120, it is determined whether a plurality of device candidates exist (step S121). When there is identification information of a plurality of substitution destination devices (for example, the devices 10A and 10C) for the task to be executed by the fault destination device 10B (YES in step S121), the task scheduler management control unit 203 selects a device in the most appropriate load state as a task allocation destination candidate from the Ready-to-Run allowable time 402 of the task (step S204). Next, in a case where there is identification information of a plurality of substitution destination devices (for example, the devices 10A and 10C) for the task executed by the fault destination device 10B (YES in Step S2041), the task scheduler management control unit 203 selects a device having the most appropriate processing performance as a task allocation destination candidate from the execution allowable time 403 of the task (Step S205). When the state of the task executed by the fault destination device is neither Ready nor Running, the task time protection function management control unit 401 sets the Ready-to-Run allowable time 402 and the execution allowable time 403 of the task in the timer of the substitution destination device (step S206).

Meanwhile, when there is no identification information of a plurality of substitution destination devices (for example, devices 10A and 10C) for the task executed by the fault destination device 10B (NO in step S121), the process proceeds to step S206 without passing through steps S204, S2041, and S205.

The task scheduler management control unit 203A acquires load information of each substitution destination device (for example, devices 10A and 10C) from the device state monitoring unit 201A (step S122). The task scheduler management control unit 203A selects the substitution destination device (for example, the device 10A) with the lowest load as an offload destination of the task and then offloads the task (step S122).

The task scheduler management control unit 203 determines whether a timer interruption has been received (step S207). When the timer interruption is received (YES in step S207), the task scheduler management control unit 203 activates the hook routine for the time protection violation and sets the execution time monitoring timer to OFF (step S208).

When the timer interruption is not received (NO in step S207), the task scheduler management control unit 203 turns off the execution time monitoring timer of the task (step S209).

Figure 11:
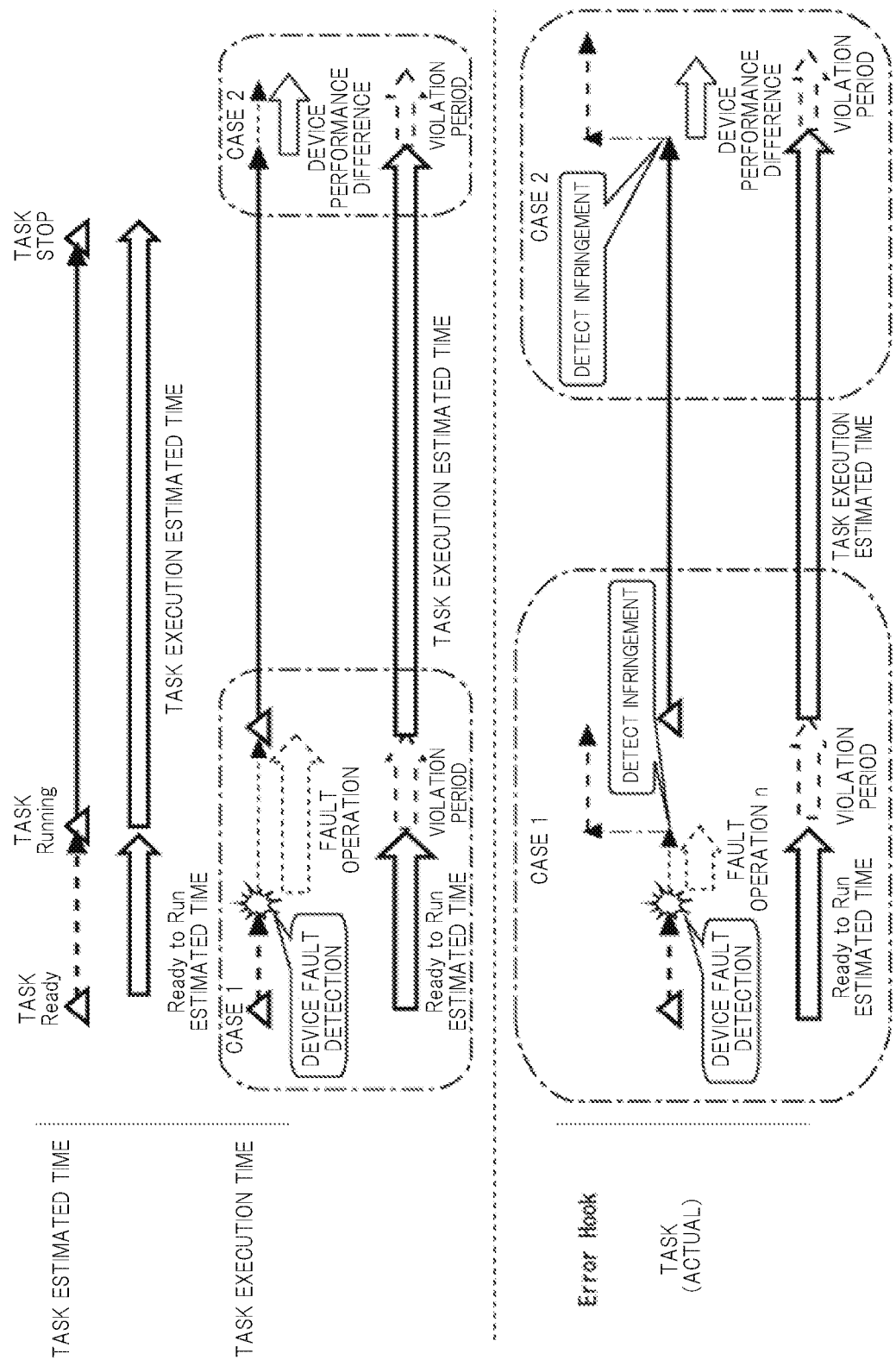
FIG. 11 is a diagram illustrating a case to be considered when the fault operation control method is applied.
Figure 12:
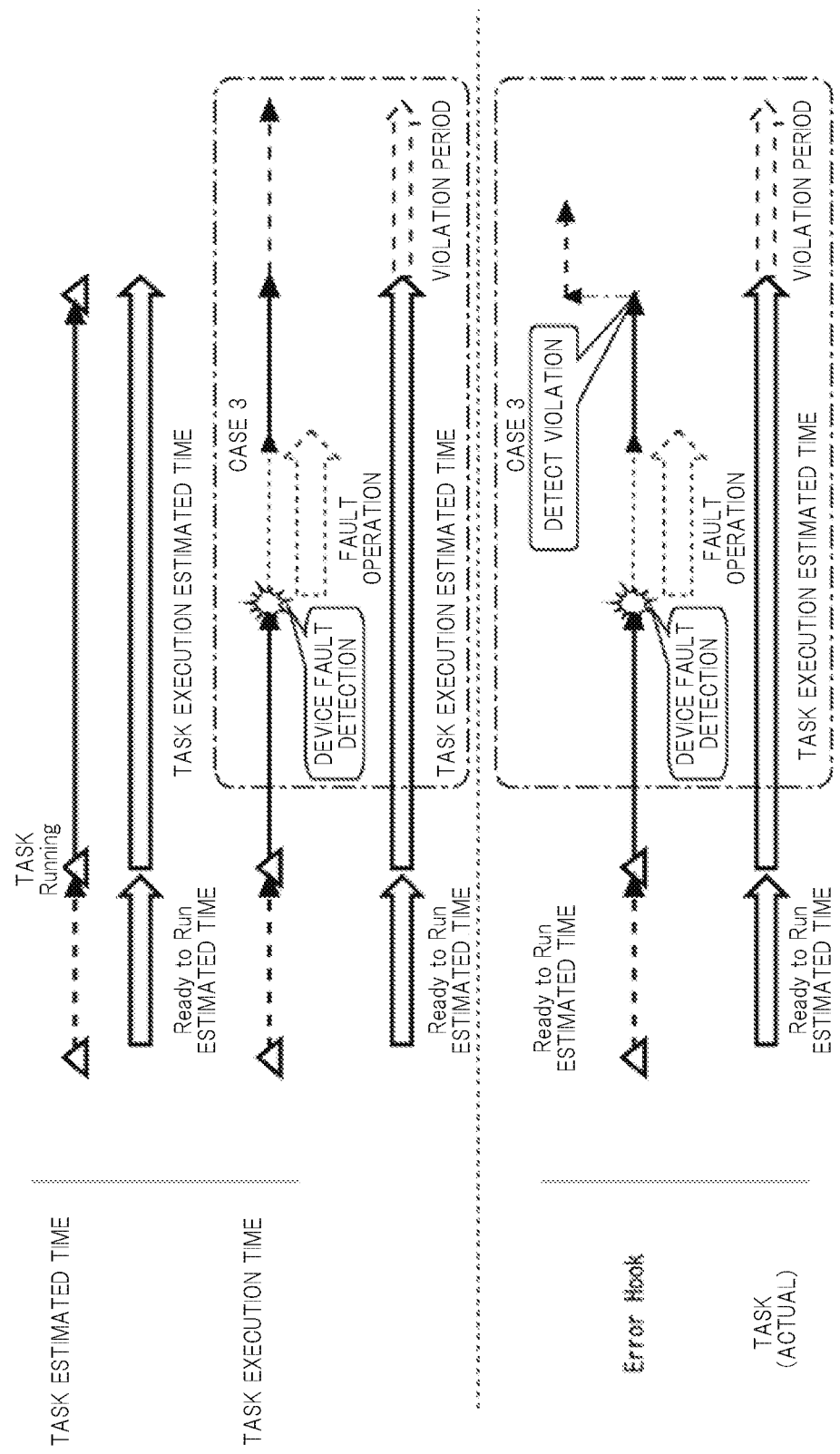
FIG. 12 is a diagram illustrating the case to be considered when the fault operation control method is applied.
Figure 13:
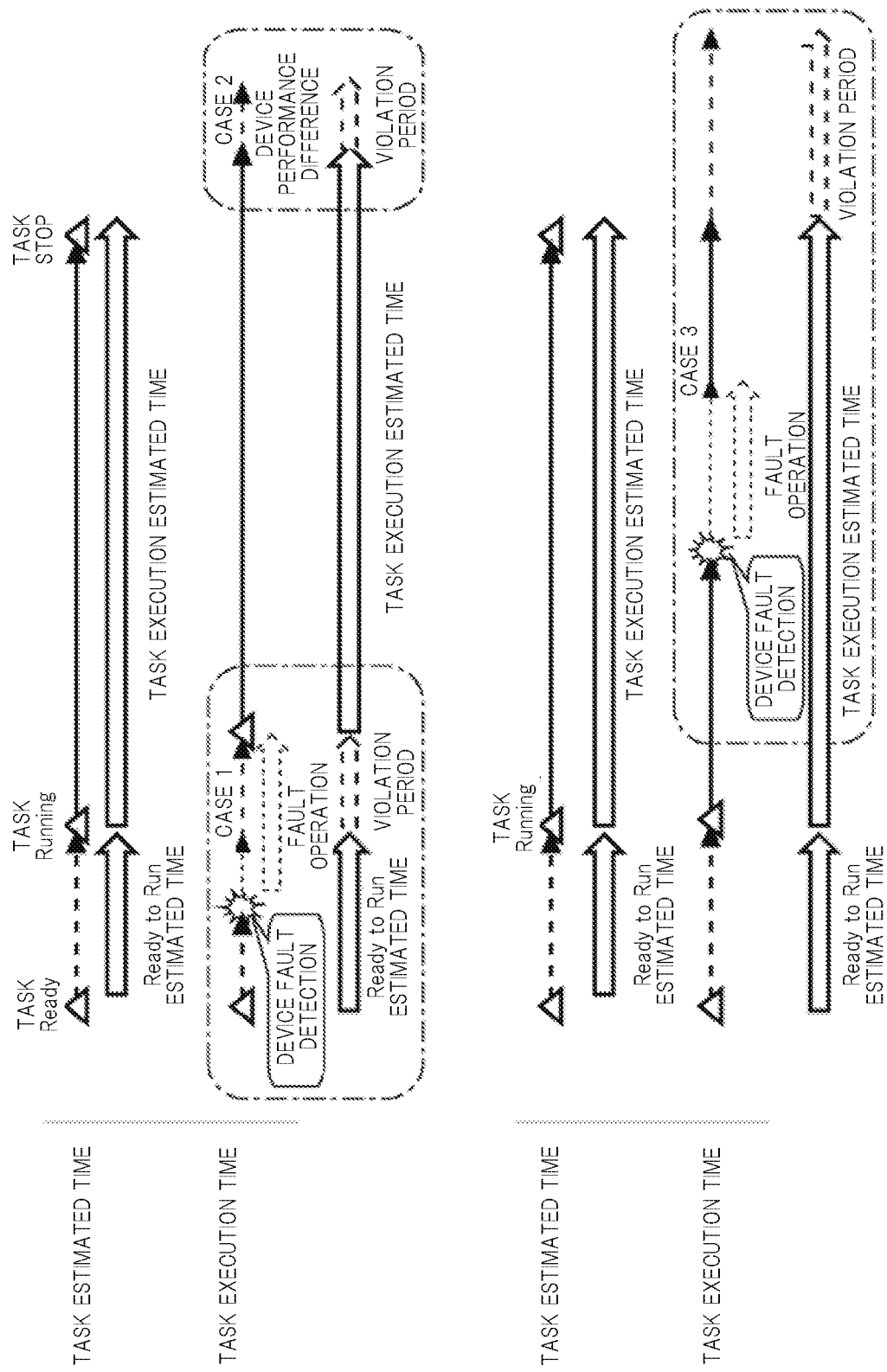
FIG. 13 is a diagram illustrating the case to be considered when the fault operation control method is applied.

An effect unique to the third embodiment is described with reference to FIGS. 11 to 13. The third embodiment solves the problem of the second embodiment. In the second Embodiment, there is a problem that constraint information on an execution time required for a task cannot be considered when the task of a fault destination device is offloaded to a device of a substitution destination.

Generally, examples of the constraint information on the execution time of the task include a length of a Ready-to-Run time from when the task enters the Ready state to when the task actually enters the Running state, and a task execution allowable time from when the task enters the Running state to when the task ends.

The following three cases should be considered when a task that must comply with the Ready-to-Run time and the worst time relative to the task execution allowable time is subject to the fault operation of the present disclosure.

Case 1: The Ready-to-Run time of the task violates the allowable time due to the fault operation processing time (see FIG. 11 or 13).

Case 2: The execution time of the task exceeds an allowable range due to a performance difference between the fault destination device and the substitution destination device (see FIG. 11).

Case 3: The task execution time violates the allowable time due to the fault operation processing time (see FIG. 12 or 13).

In consideration of the above case, in the third embodiment, the task time protection function management control unit 401 illustrated in FIG. 8 is added to the multi-device SW framework according to the second embodiment, and the Ready-to-Run allowable time 402 of the task and the execution allowable time 403 of the task of the RTOS management information 158 are added. The task time protection function management control unit 401 performs time protection for the fault destination task instead of the RTOS of the fault destination device. As a result, when the fault destination task is offloaded to the substitution destination device in the second embodiment, the constraint information on the execution time required for the task can be considered.

Figure 14:
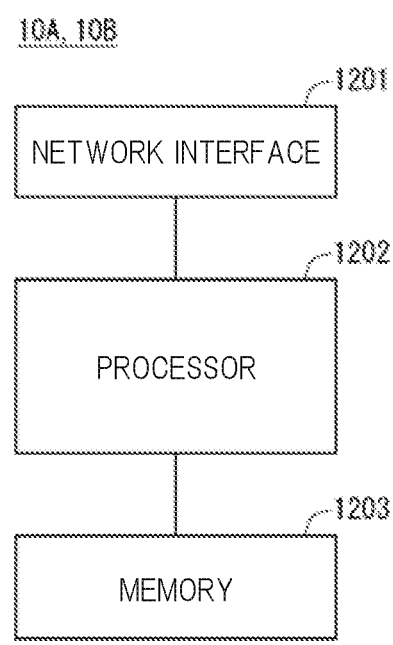
FIG. 14 is a block diagram illustrating a hardware configuration example of each device.

FIG. 14 is a block diagram illustrating a hardware configuration example of the devices 10A and 10B . . . (hereinafter, referred to as the device 10 or the like). Referring back to FIG. 14, the device 10 and the like include a network interface 1201, a processor 1202, and a memory 1203. The network interface 1201 is used to communicate with other network node devices configuring the communications system. The network interface 1201 may be used to perform wireless communications. For example, the network interface 1201 may be used to perform wireless LAN communication defined in IEEE 802.11 series or mobile communication defined in 3rd Generation Partnership Project (3GPP (registered trademark)). Alternatively, the network interface 1201 may include, for example, a network interface card (NIC) conforming to IEEE 802.3 series.

The processor 1202 reads and executes software (computer program) from the memory 1203, thereby performing processing of the device 10 and the like described using the flowchart or sequence in the above-described embodiment. The processor 1202 may be, for example, a microprocessor, a micro processing unit (MPU), a graphics processing unit (GPU), or a central processing unit (CPU). The processor 1202 may include a plurality of processors.

The memory 1203 is configured by a combination of a volatile memory and a nonvolatile memory. The memory 1203 may include a storage located away from the processor 1202. In this case, the processor 1202 may access the memory 1203 through an I/O interface (not illustrated).

In the example of FIG. 14, the memory 1203 is used to store a software module group. The processor 1202 can perform the processing of the device 10 and the like described in the above-described embodiment by reading and executing these software module groups from the memory 1203.

As described with reference to the flowchart of FIG. 6, FIG. 10, or the like, each of the processors included in the device 10 or the like executes one or a plurality of programs including an instruction group for causing a computer to perform the algorithm described with reference to the drawings.

Although the invention made by the present inventors has been specifically described based on the embodiments, the present invention is not limited to the embodiments described above, and it goes without saying that various modifications can be made without departing from the gist of the present invention.

What is claimed is:

1. A fault operation control system in a multi-device comprising:
   a first device including a first processor and a first memory that stores a first instruction configured to be executed by the first processor; and
   a second device including a second processor that is different from the first processor and a second memory that stores a second instruction configured to be executed by the second processor, wherein the first instruction includes:
  causing the first processor to monitor a state related to use of a resource of the first device and store monitoring information of the first device in a storage area during a normal operation;
wherein the second instruction includes:
  causing the second processor to monitor a state of the second device and store monitoring information of the second device in the storage area;
wherein the first instruction further includes:
  causing the first processor to calculate difference information by comparing hardware resource information of the second device used by a task that is executed by the second device before occurrence of a fault with resource information of the first device based on the stored first and second monitoring information, in a case where it is detected that the fault occurs in the second device; and
  causing the first processor to determine and execute countermeasure method for a fault operation according to the calculated difference information, and
wherein the first processor and the second processor have a heterogeneous configuration.

2. The fault operation control system according to claim 1,
  wherein the multi-device further includes a third device including a third processor that is different from the first processor and a third memory that stores a third instruction configured to be executed by the third processor, and
  wherein the countermeasure method for the fault operation is stored in a database in correspondence with each of a specification difference between the first device and the second device and a specification difference between the first device and the third device.

3. The fault operation control system according to claim 1, wherein the countermeasure method for the fault operation is stored in a database for each task executed by the first device and the second device.

4. The fault operation control system according to claim 1, wherein the first instruction further includes:
  changing an offload destination of a task to be executed by the second device to the first device; and
  offloading the task to the first device based on a priority of the task to be executed by the second device.

5. The fault operation control system according to claim 1,
  wherein the multi-device further includes a third device including a third processor that is different from the first processor and a third memory that stores a third instruction configured to be executed by the third processor, and
  wherein if it is determined that a device with no difference is the first device and the third device from the calculated difference information, the first instruction further includes selecting a device with lowest load as an alternative device and offloading the task of the second device.

6. The fault operation control system according to claim 1, wherein the countermeasure method for the fault operation includes fail-safe processing for safely stopping the system.

7. The fault operation control system according to claim 1, wherein the first instruction further includes:
  causing the first processor to acquire Ready-to-Run allowable time of the task executed by the second device, execution allowable time of the task, and a state of the task from RTOS management information of the second device, immediately after detecting the fault;
  causing the first processor to set the Ready-to-Run allowable time of the task executed by the second device in a timer when the task is in a Ready state; and
  causing the first processor to set the execution allowable time of the task executed by the second device in the timer when the task is in a Running state.

8. The fault operation control system according to claim 7,
  wherein the first instruction further includes causing the first processor to select a device in a most appropriate load state as a task allocation destination candidate from the Ready-to-Run allowable time of a task, after acquiring identification information of a device that is a candidate for a substitution destination.

9. A fault operation control method in a multi-device including a first device including a first processor and a first memory and a second device including a second processor that is different from the first processor and a second memory, the method comprising:
  causing the first processor to monitor a state related to use of a resource of the first device and store monitoring information in a storage area during a normal operation;
  causing the second processor to monitor a state of the second device and store monitoring information in the storage area;
  causing the first processor to calculate difference information by comparing hardware resource information of the second device used by a task that is executed by the second device before occurrence of a fault with resource information of the first device based on the stored monitoring information, in a case where it is detected that the fault occurs in the second device; and
  determining and executing a countermeasure method for a fault operation according to the calculated difference information,
  wherein the first processor and the second processor have a heterogeneous configuration.

10. The fault operation control method according to claim 9,
  wherein the multi-device further includes a third device including a third processor that is different from the first processor and a third memory that stores an instruction configured to be executed by the third processor, and
  wherein the countermeasure method for the fault operation is stored in a database in correspondence with each of a specification difference between the first device and the second device and a specification difference between the first device and the third device.

11. The fault operation control method according to claim 9, wherein the countermeasure method for the fault operation is stored in a database for each task executed by the first device and the second device.

12. The fault operation control method according to claim 9, further comprising:
  causing the first processor to acquire Ready-to-Run allowable time of the task executed by the second device, execution allowable time of the task, and a state of the task from RTOS management information of the second device, immediately after detecting the fault;
  causing the first processor to set the Ready-to-Run allowable time of the task executed by the second device in a timer when the task is in a Ready state; and causing the first processor to set the execution allowable time of the task executed by the second device in the timer when the task is in a Running state.

13. A non-transitory computer readable medium that stores a program causing a computer to execute a fault operation control method in a multi-device including a first device including a first processor and a first memory and a second device including a second processor that is different from the first processor and a second memory, the method comprising:
   causing the first processor to monitor a state related to use of a resource of the first device and store monitoring information in a storage area during a normal operation;
   causing the second processor to monitor a state of the second device and store monitoring information in the storage area;
   causing the first processor to calculate difference information by comparing hardware resource information of the second device used by a task that is executed by the second device before occurrence of a fault with resource information of the first device based on the stored monitoring information, in a case where it is detected that the fault occurs in the second device; and
   determining and executing a countermeasure method for a fault operation according to the calculated difference information,
   wherein the first processor and the second processor have a heterogeneous configuration.

14. The non-transitory computer readable medium according to claim 13,
   wherein the multi-device further includes a third device including a third processor that is different from the first processor and a third memory that stores an instruction configured to be executed by the third processor, and
   wherein the countermeasure method for the fault operation is stored in a database in correspondence with each of a specification difference between the first device and the second device and a specification difference between the first device and the third device.

15. The non-transitory computer readable medium according to claim 13, wherein the countermeasure method for the fault operation is stored in a database for each task executed by the first device and the second device.

16. The non-transitory computer readable medium according to claim 13, wherein the fault operation control method further includes:
   causing the first processor to acquire Ready-to-Run allowable time of the task executed by the second device, execution allowable time of the task, and a state of the task from RTOS management information of the second device, immediately after detecting the fault;
   causing the first processor to set the Ready-to-Run allowable time of the task executed by the second device in a timer when the task is in a Ready state; and
   causing the first processor to set the execution allowable time of the task executed by the second device in the timer when the task is in a Running state.

* * * * *